US009733137B2

(12) United States Patent
Urata

(10) Patent No.: US 9,733,137 B2
(45) Date of Patent: Aug. 15, 2017

(54) ROTATIONAL DRIVE DEVICE

(71) Applicant: Schaft Inc., Koto-Ku, Tokyo (JP)

(72) Inventor: Junichi Urata, Tokyo (JP)

(73) Assignee: Schaft Inc., Tokyo (JP)

( * ) Notice: Subject to any disclaimer, the term of this patent is extended or adjusted under 35 U.S.C. 154(b) by 252 days.

(21) Appl. No.: 14/649,019

(22) PCT Filed: Dec. 16, 2013

(86) PCT No.: PCT/JP2013/083571
§ 371 (c)(1),
(2) Date: Jun. 2, 2015

(87) PCT Pub. No.: WO2014/098008
PCT Pub. Date: Jun. 26, 2014

(65) Prior Publication Data
US 2015/0316428 A1     Nov. 5, 2015

(30) Foreign Application Priority Data

Dec. 22, 2012  (JP) ................................. 2012-280356

(51) Int. Cl.
*G01L 3/04* (2006.01)
*H02K 7/116* (2006.01)
(Continued)

(52) U.S. Cl.
CPC .............. *G01L 3/04* (2013.01); *F16H 49/001* (2013.01); *F16H 57/01* (2013.01); *H02K 7/116* (2013.01);
(Continued)

(58) Field of Classification Search
CPC .. F16H 57/01; F16H 49/001; F16H 2057/018; H02P 6/16; H02P 29/00;
(Continued)

(56) References Cited

U.S. PATENT DOCUMENTS

2012/0014631 A1    1/2012    Huang et al.

FOREIGN PATENT DOCUMENTS

DE    102009034832    2/2011
JP         1-191368    8/1989
(Continued)

OTHER PUBLICATIONS

Supplementary European Search Report prepared by the European Patent Office in application No. 13864933.0 mailed Jul. 20, 2016.
(Continued)

*Primary Examiner* — Mohamad Musleh
(74) *Attorney, Agent, or Firm* — McDonnell Boehnen Hulbert & Berghoff LLP

(57) ABSTRACT

The structure for detecting tooth-skipping of the speed reducer of the rotary driver is reduced in weight and size. In the rotary driver the occurrence of tooth-skipping is detected based on the difference in outputs from the encoders located at the input side (the side of the motor) and at the output side (the side of the load), which is opposite the input side in relation to the speed reducer. The rotary driver comprises a motor, a speed reducer located between the motor and a load to reduce the rotary speed of a rotary shaft at the side of the motor, to thereby transmit the reduced rotary speed to a rotary shaft at the side of the load, a first encoder for detecting a rotation of the rotary shaft at the side of the motor, a second encoder for detecting a rotation of the rotary shaft at the side of the load, a section for detecting any difference between a first detected value that is obtained by dividing an output of the first encoder by a rate for reducing the speed by the speed reducer and a second detected value that is obtained from an output of the second encoder, and a section for detecting tooth-skipping that detects tooth-skipping of the speed reducer based on the difference.

9 Claims, 12 Drawing Sheets

(51) Int. Cl.
   *F16H 49/00*    (2006.01)
   *F16H 57/01*    (2012.01)
   *H02P 29/00*    (2016.01)
   *H02P 6/16*     (2016.01)
   *H02P 29/024*   (2016.01)

(52) U.S. Cl.
   CPC ............... *H02P 6/16* (2013.01); *H02P 29/00* (2013.01); *H02P 29/0241* (2016.02); *F16H 2057/018* (2013.01); *H02P 2203/00* (2013.01)

(58) Field of Classification Search
   CPC .... H02P 29/0241; H02P 2203/00; G01L 3/04; H02K 7/116
   See application file for complete search history.

(56) References Cited

FOREIGN PATENT DOCUMENTS

| | | |
|---|---|---|
| JP | 10-58374 | 3/1998 |
| JP | 11-190405 | 7/1999 |
| JP | 2002-71005 | 3/2002 |
| JP | 2005-328374 | 11/2005 |
| JP | 2006-347406 | 12/2006 |
| JP | 2010-284931 | 12/2010 |
| JP | 2011-176913 | 9/2011 |

OTHER PUBLICATIONS

International Search Report prepared by the Japanese Patent Office in international application No. PCT/JP2013/083571 completed Mar. 10, 2014.

International Preliminary Report on Patentability and Written Opinion prepared by the Japanese Patent Office in international application No. PCT/JP2013/083571 mailed Jul. 2, 2015.

$\theta d > \theta+$ ($\theta d \geqq \theta+$): an excess torque $\theta d < \theta-$ ($\theta d \leqq \theta-$): an excess load $\theta- < \theta d < \theta+$ ($\theta- \leqq \theta d \leqq \theta+$): no tooth-skipping $\theta+ \leqq \theta d$ ($\theta+ < \theta d$) : plus tooth-skipping $\theta d \leqq \theta-$ ($\theta d < \theta-$) : minus tooth-skipping (a)

(b)

ROTATIONAL DRIVE DEVICE

TECHNICAL FIELD

The present invention relates to a rotary driver, specifically to a rotary driver for driving a rotary shaft via a speed reducer. The rotary driver of the present invention can be used for driving a joint of a robot, such as that for an arm, a leg, and a hand.

BACKGROUND ART

A mechanism for transmitting a force from the rotation of a motor, such as an AC servomotor and a DC servomotor, to a load via a speed reducer, has been known as a rotary driver for driving a joint of a robot, such as that for an arm, a leg, and a hand. A large torque can be obtained by reducing the number of rotations of the motor by the speed reducer.

Since the rotary driver drives the rotary shaft via the speed reducer, torque is applied to the rotary shaft of the speed reducer. The torque is known to cause a distortion or a slippage of the speed reducer, to thereby affect the accurate operation of a robot. Thus an invention to calculate torque that is applied to the rotary shaft of the speed reducer based on the difference in the rotated angles of a first encoder, which is attached to the rotary shaft of a servomotor, and a second encoder, which is attached to the rotary shaft of the speed reducer, is disclosed (Patent Publication 1).

In a speed reducer that is structured by gears, if a large torque is applied, a phenomenon called tooth-skipping occurs, so that the rotary shaft is rotated to no useful purpose. Thus an error in the number of rotations of the rotary shaft at the input side and that of the rotary shaft at the output side are generated.

An invention disclosed in which the relative number of the rotations of the rotary shaft at the input side and the rotary shaft at the output side is measured by one encoder (Patent Publication 2). In that invention, if a time derivative of that relative number of rotations exceeds a predetermined rate, it is determined that tooth-skipping has occurred.

Patent Literature

Patent Publication 1: Japanese Patent Laid-open Publication No. 2011-176913.
Patent Publication 2: Japanese Patent Laid-open Publication No. 2006-347406.

DISCLOSURE OF INVENTION

Problems to be Solved by the Invention

Since by the invention for detecting tooth-skipping that is disclosed by Patent Publication 2 the relative number of rotations of the rotary shaft at the input side and the rotary shaft at the output side is measured by one encoder, the encoder is located between the shaft at the input side and the housing that is connected to the shaft at the output side. Thus there are problems in that the structure of the actuator becomes complicated and the size of it is increased. The invention disclosed by Patent Publication 1 is to estimate the torque of the rotary shaft of the speed reducer. So it says nothing about tooth-skipping in the speed reducer.

In a rotary driver for driving a joint of a robot, such as that for an arm, a leg, and a hand, the speed reducer itself functions as a load that is applied to the motor in addition to the load that is subject to be operated and the load of a member of the mechanism such as an arm, a leg, and a hand. These loads are applied to the motor.

Since a load that is applied to the motor must be reduced so as to realize a smooth operation at a high speed, it is requested that the speed reducer be light.

Further, to extend the area for an operation of a joint, no interference with any other member of the mechanism should occur. Thus it is requested that the speed reducer be small.

The purpose of the present invention is to provide a light and small mechanism for detecting the tooth-skipping of the speed reducer of the rotary driver so as to resolve the above problems.

Means for Resolving the Problems

By the present invention, encoders are provided at the side of the motor and the side of the load of the rotary shaft of the speed reducer so that information on the rotations of the rotary shaft of the speed reducer at the side of the motor and information on the rotations at the side of the load are detected by the encoders. The difference in the two pieces of information on the rotations corresponds to the difference in the rotated angles of the rotary shaft of the speed reducer at the side of the motor and that at the side of the load.

If the speed reducer includes an elastic element so that a rotated angle caused by backlash can be reduced and be ignored or be made to be within a set tolerance, the difference in the information on the rotations that is obtained by two encoders corresponds to the amount of deformation (distortion) of the rotary shaft of the speed reducer. The torque that is applied to the speed reducer can be estimated by multiplying the torsional stiffness K (a spring constant) by that difference.

A strain wave gearing (Harmonic Drive, a registered trademark) has been known as a speed reducer that includes an elastic element to decrease backlash.

In the rotary driver of the present invention, the occurrence of any tooth-skipping of the speed reducer can be detected based on the difference in outputs in the encoder attached to the rotary shaft at the input side (at the side of the motor) and the encoder attached to the rotary shaft at the output side (at the side of the load), wherein the output side is opposed to the input side in relation to the speed reducer. The encoders are not necessarily located within the speed reducer, and so may be located outside it.

The signals that are used for detecting tooth-skipping are the outputs from the encoders. The encoders can be located at any positions and may be located outside the speed reducer if they detect the rotations of the rotary shaft at both sides. These sides are located on opposite sides of the speed reducer. Thus the rotary driver can be downsized.

The structure that includes the encoders can be made by just attaching encoders to the rotary shaft of which the rotations are to be detected. Thus no special mechanism for transmitting the force from the rotation of the output shaft to the input shaft is needed. This mechanism is necessary for the housing that is connected to the shaft at the output side in Patent Publication 2. Thus the rotary driver can be made to be light.

The rotary driver of the present invention comprises a motor, a speed reducer located between the motor and a load to reduce the rotary speed of a rotary shaft at the side of the motor, to thereby transmit the reduced rotary speed to a rotary shaft at the side of the load, a first encoder for detecting a rotation of the rotary shaft at the side of the motor, a second encoder for detecting a rotation of the rotary shall at the side of the load, a section for detecting any difference between a first detected value that is obtained by dividing an output of the first encoder by a rate for reducing the speed by the speed reducer and a second detected value that is obtained from an output of the second encoder, and a section for detecting tooth-skipping that detects tooth-skipping of the speed reducer based on the difference.

For the speed reducer, a strain wave gearing (Harmonic Drive, a registered trademark) is preferably used, but is not limited to a strain wave gearing. The strain wave gearing (Harmonic Drive, a registered trademark) comprises a wave generator, an elliptical flexible gear (a flexspline), and a circular ring gear (a circular spline). The ring gear is generally circular so that teeth, the number of which is greater than that of the flexible gear, are formed on the inner periphery. The surrounding wall of the flexible gear is put around the wave generator to be elastically deformed in an ellipse so that it engages with the ring gear at two points on the long axis of the ellipse. When the wave generator rotates once the ring gear rotates in relation to the flexible gear so that the speed of the rotations is reduced by the difference in their number of teeth.

The first encoder detects the rotation of the rotary shaft of the speed reducer at the side of the motor. The second encoder detects that rotation at the side of the load. For example, incremental or absolute rotary encoders, or potentiometers, may be used for the encoders. They output signals detected in connection with the rotations of the rotary shafts. A means for detecting a linear movement, such as a linear encoder, may be used besides a means for detecting a rotation. When a linear encoder is used, for example, a linear movement that is converted from the rotation of the rotary shaft or a movement of a part that linearly moves in connection with the rotation of the rotary shaft is measured by the encoder.

The signal detected by the incremental encoder equals the counted number that corresponds to the rotated angle of the rotary shaft. Thus, if the first and second encoders are the incremental encoders, the first incremental encoder outputs the counted number that corresponds to the rotated angle of the rotary shaft at the side of the motor and the second incremental encoder outputs the counted number that corresponds to the rotated angle of the rotary shaft at the side of the load.

The signal detected by the absolute encoder equals the angle that corresponds to the rotated angle of the rotary shaft. Thus, if the first and second encoders are the absolute encoders, the first absolute encoder outputs data on the angle that corresponds to the rotated angle of the rotary shaft at the side of the motor and the second absolute encoder outputs data on the angle that corresponds to the rotated angle of the rotary shaft at the side of the load.

As discussed above, the encoders provided to the speed reducer at the side of the motor and the side of the load can be incremental encoders or absolute encoders. Alternatively, one may be an incremental encoder and the other may be an absolute encoder. When different types of encoders are provided to the speed reducer at the respective sides, the incremental encoder may be provided to the side of the motor and the absolute one may be provided to the side of the load, or vice versa.

Since the speed reducer transmits the force from the rotation of the rotary shaft at the side of the motor to the rotary shaft at the side of the load after reducing the speed of the rotation, the counted number that is output by the second encoder is the value that is calculated by dividing the counted number or the detected angle that is output by the second encoder by the rate M for reducing the speed of the speed reducer. The rate M for reducing the speed of the speed reducer means that the rotary shaft at the output side rotates once while the rotary shaft at the input side rotates M rotations.

The counted number or the detected angle of the second encoder becomes the Mth part of the counted number of the first encoder because of the rate for reducing the speed by the speed reducer. Thus, to compare the number of rotations of, or the detected angle of, the rotary shaft at the side of the motor of the speed reducer with that at the side of the load, the counted number of the first encoder must be reduced to the Mth part. Thus the output of the first encoder is divided by the rate M for reducing the speed by the speed reducer to be converted to the same level as the output of the second encoder so as to compare the counted number, or the detected angle of, the first encoder, with that of the second encoder.

The section for detecting the difference is used to obtain the difference between the first detected value that is obtained by dividing the output of the first encoder by the rate for reducing the speed and the second detected value that is obtained from the output of the second encoder. That difference equals the difference between the rotated angle of the rotary shaft at the side of the motor and the rotated angle of the rotary shaft at the side of the load. If no backlash occurs in the speed reducer, under normal conditions it indicates torsion caused by the elasticity of the speed reducer. It corresponds to torque in the speed reducer.

Herein the words "the normal conditions" mean the conditions where no tooth-skipping occurs in the speed reducer. If tooth-skipping occurs in it, the difference indicates the angle that is rotated to no useful purpose by mainly tooth-skipping. If no tooth-skipping occurs in it, the difference changes in the linear relation to the torque in the rotary shaft. However, if tooth-skipping occurs, the difference steeply changes in the non-linear relation to the torque in the rotary shaft.

By the present invention tooth-skipping is detected based on that difference. The difference is compared with a predetermined threshold to detect the occurrence of tooth-skipping in the speed reducer by using the comparison of the difference with the threshold.

The threshold for detecting tooth-skipping can be determined by preliminarily estimating a difference when tooth-skipping occurs and giving allowance for the difference.

Judgment of the Direction of Tooth-Skipping

The section for detecting the tooth-skipping of the present invention is configured to detect the rotation of the rotary shaft at the input side of the speed reducer (at the side of the motor) by the first encoder and the rotation of the rotary shaft at the output side of the speed reducer (at the side of the load) by the second encoder so as to judge if plus tooth-skipping occurs or minus tooth-skipping occurs based on the difference in the detected values. Herein the words "plus tooth-skipping" mean tooth-skipping wherein the number of rotations at the side of the motor is larger than the number of rotations at the side of the load. The words "minus tooth-skipping" mean tooth-skipping wherein the number of rotations at the side of the load is larger than the number of rotations at the side of the motor.

Examples include the following: wherein the difference that is obtained by deducting the detected value of the second encoder from the detected value of the first encoder is plus and the number of rotations at the side of the motor is larger than the number of rotations at the side of the load, so that tooth-skipping occurs, rapidly applying a great torque to the motor, to cause the shaft of the motor to rotate for no useful purpose in the positive side, so that tooth-skipping occurs, and applying a great load to the rotary shaft at the side of the load while accelerating the rotation of the shaft by torque from the motor, to cause the shaft of the motor to rotate for no useful purpose in the positive side, so that tooth-skipping occurs.

Examples include the following: wherein the difference that is obtained by deducting the detected value of the second encoder from the detected value of the first encoder is minus and the number of rotations at the side of the motor is smaller than the number of rotations at the side of the load, so that tooth-skipping occurs, rapidly applying a large torque for braking the rotation of the rotary shaft at a high speed in the positive side, to cause the shaft of the motor to rotate for no useful purpose in a negative direction (the braking direction), so that tooth-skipping occurs, and stopping the rotation of the rotary shaft at the side of the load when the rotary shaft rotates in the negative direction at a high speed, to cause the rotary shaft at the side of the motor to rotate for no useful purpose in the negative direction, so that tooth-skipping occurs.

The section for detecting the tooth-skipping is provided so as to judge if the tooth-skipping is positive or negative. By the section for detecting the tooth-skipping a remainder that is calculated by subtracting the second detected value, which is an output of the second encoder, from the first detected value, which is an output of the first encoder, is recognized as the difference. The threshold to be compared with the difference includes a positive first threshold that is compared with the positive difference if the first detected value is greater than the second detected value or if the first detected value is equal to, or greater than, the second detected value. It also includes a negative second threshold that is compared with the negative difference if the first detected value is smaller than the second detected value or if the first detected value is equal to, or smaller than, the second detected value.

If the positive difference is equal to, or greater than, the first threshold in a positive side, plus tooth-skipping is detected. If the negative difference is equal to, or smaller than, the second threshold in a negative side, minus tooth-skipping is detected.

In comparing the difference with the threshold, if the words "greater than" or "smaller than" are used, a condition where the difference is equal to the threshold is not included. If the words "equal to, or greater than" or "equal to, or smaller than" are used, a condition where the difference is equal to the threshold is included. If the difference and the threshold have the same value, the result of the detection to see if tooth-skipping occurs can be determined without the result being confused.

The plus tooth-skipping and minus tooth-skipping can be detected as above in the case where the rotary shaft of the speed reducer at the side of the motor and the rotary shaft of the speed reducer at the side of the load rotate in the same direction or in the reverse direction.

If the difference is between the first threshold and the second threshold, it is determined that no tooth-skipping has occurred in the speed reducer.

Correction Based on the Detection of Tooth-Skipping

By the rotary driver of the present invention an error in the rotary driver that is generated by tooth-skipping can be corrected by detecting tooth-skipping by the section for detecting the tooth-skipping. The correction can be performed by correcting the output difference by the section for detecting the difference or by correcting the detected value, such as the counted number or the detected angle from the encoder, prior to inputting it to the section for detecting the difference.

In a system for controlling the driving of the rotary shaft, which system controls the supply of current to the motor for driving the rotary driver, the difference or the detected value, such as the counted number or the detected angle from the encoder, is corrected based on the detection of tooth-skipping by the section for detecting tooth-skipping. Based on that correction the torque or rotated angle can be corrected. By feedback from the corrected torque the torque of the motor can be controlled. By feedback from the corrected rotated angle the rotated angle can be controlled.

Since the actual value at the side of the load can be obtained from the detected value of the second encoder, it makes little sense to correct the detected value of the second encoder based on the detection of tooth-skipping.

In the configuration of the present invention a highly accurate encoder is used for the first encoder at the side of the motor and a inaccurate encoder that can detect tooth-skipping by using the difference is used for the second encoder at the side of the load. The detected tooth-skipping by the highly accurate encoder is corrected based on the detection of the tooth-skipping so as to obtain the highly accurate number of rotations at the side of the load. Since, by that configuration, an economical encoder can be used for the second encoder the cost for a driver for the circuit can be reduced.

The detected value of the first encoder can be corrected by the configuration of the present invention. So information on the rotation of the rotary shaft at the side of the motor can be corrected. By this configuration, if a target is set for the number of rotations or the rotated angle of the rotary shaft at, the side of the motor, a gap between the corrected information on the rotation and the target can be obtained.

Correction of the Difference Based on the Detection of Tooth-Skipping and the System for Controlling the Driving of the Rotary Shaft The rotary driver of the present invention comprises a section for correcting the difference that corrects the difference based on the detected tooth-skipping. The section for correcting the difference calculates an amount for correcting the difference, which amount corresponds to the number of skipped teeth, from the difference. It obtains a corrected difference by correcting the difference by the obtained amount.

The system for controlling the driving of the rotary shaft, which controls the supply of current to the motor for driving the rotary driver, comprises a section for estimating torque, a section for correcting the angle, a section for controlling the angle, a section for controlling the torque, and a section for controlling the current. The section for estimating torque estimates torque by multiplying the corrected difference in a rotated angle by the torsional stiffness K of the speed reducer, wherein the corrected difference is obtained by converting the corrected difference to an angle. The section for correcting the angle corrects the rotated angle of the rotary shaft at the side of the load based on the corrected difference. The section for controlling the angle generates a designated torque based on a difference between the designated angle and the corrected rotated angle of the rotary shaft at the side of the load, wherein the designated torque is used for bringing the rotated angle of the rotary shaft at the side of the load close to the designated angle. The section for controlling the torque generates a designated current based on the difference between the designated torque and the estimated torque, wherein the designated current is used for bringing the estimated torque close to the designated torque. The section for controlling the current supplies current to the motor based on the designated current.

By controlling the driving of the rotary shaft of the present invention, a system for supplying current to the motor based on the designated torque can be structured. A system for controlling a target torque can be structured by inputting into the section for controlling the torque the estimated torque that is estimated in the section for estimating torque and the designated torque for the target torque, without installing the section for controlling the angle. The section for controlling the angle generates a designated angle and a designated torque for bringing the rotated angle close to the designated angle. It is installed in the system for controlling the driving of the rotary shaft.

The section for estimating torque estimates the estimated torque based on the corrected difference. The section for correcting the angle corrects the rotated angle of the rotary shaft at the side of the load based on the corrected difference. Thus feedback to the section for controlling the angle and the section for controlling the torque can be corrected by the amount of tooth-skipping. The section for controlling the angle and the section for controlling the torque are installed in the system for controlling the driving of the rotary shaft that controls the supply of current.

Correction of the Detected Value Based on the Detection of Tooth-Skipping

The rotary driver of the present invention comprises a section for correcting the detected value that corrects the detected value. The section for correcting the detected value calculates an amount for correcting the detected value from the difference. The amount for correcting the detected value corresponds to the number of skipped teeth. If the first detected value or the second detected value is a counted number by the first encoder or the second encoder, the counted number by the first encoder or the second encoder is corrected by the amount for correcting the detected value so as to calculate the difference of the counted number based on the corrected counted number. If the first detected value or the second detected value is a rotated angle that is obtained by converting the counted number by the first encoder or the second encoder to an angle, the rotated angle of the rotary shaft at the side of the motor or at the side of the load is corrected so as to calculate the difference of the rotated angle based on the corrected rotated angle.

If the first detected value or the second detected value is a detected angle by the first absolute encoder or the second absolute encoder, the detected angle of the rotary shaft at the side of the motor or at the side of the load is corrected by the amount for correcting the detected value so as to obtain the difference of the rotated angle based on the corrected detected angle. If the first detected value or the second detected value is a detected angle by the first incremental encoder or the second incremental encoder, the detected angle of the rotary shaft at the side of the motor or at the side of the load is corrected by the amount for correcting the detected value so as to obtain the difference of the rotated angle based on the corrected detected angle.

Both the first encoder and the second encoder may be the absolute encoders or the incremental encoders. Alternatively, one of them may be the absolute encoder and the other may be the incremental encoder.

The system for controlling the driving of the rotary shaft that controls the supply of current to the motor for driving the rotary driver comprises a section for estimating torque, a section for controlling the angle, a section for controlling the torque, and a section for controlling current. The section for estimating torque estimates torque by multiplying a difference in a rotated angle by the torsional stiffness K of the speed reducer. The difference in a rotated angle is obtained by converting the corrected counted number to an angle or is obtained as a corrected detected value if the corrected detected value is a rotated angle. The section for controlling the angle generates a designated torque for bringing the rotated angle of the rotary shaft at the side of the load close to a designated angle based on the difference between the rotated angle of the rotary shaft at the side of the load and the designated angle. The rotated angle of the rotary shaft at the side of the load is obtained by converting the corrected counted number to an angle or is obtained as a corrected detected value if the corrected detected value is a rotated angle. The section for controlling the torque generates a designated current for bringing the estimated torque close to the designated torque based on a difference between the designated torque and the estimated torque. The section for controlling current supplies current c motor based on the designated current.

The section for estimating torque estimates the estimated torque based on the corrected counted number or the corrected rotated angle. The rotated angle in the section for correcting the angle is corrected by using the corrected counted number or the corrected rotated angle. Thus feedback to the section for controlling the angle or the section for controlling the torque of the system for controlling the driving of the rotary shaft, which controls the supply of current, an be corrected by the amount of tooth-skipping.

A system for controlling the supply of current to the motor based on the designated torque can be structured by using the above-mentioned control for driving the rotary shaft. A system for controlling a target torque can be structured by eliminating the section for controlling the angle that generates the designated angle and the designated torque for bringing the rotated angle close to the designated angle in the system for controlling the driving of the rotary shaft. In the system for controlling the supply of current the estimated torque of the section for estimating torque and the designated torque for the target torque are input.

Predicting a Lifetime Based on the Detection of Tooth-Skipping

By the present invention the lifetime of the speed reducer can be predicted by comparing the accumulated number of tooth-skipping with the predetermined accumulated number of tooth-skipping that is set based on the operational record of the speed reducer.

The rotary driver of the present invention comprises a section for predicting a lifetime that predicts the lifetime of the speed reducer based on the result by the section for detecting the tooth-skipping. The section for predicting the lifetime comprises a memory section and a section for prediction. The memory section stores the predetermined accumulated number of tooth-skipping. This number is set based on the operational record of the speed reducer. The section for prediction predicts the lifetime of the speed reducer based on the accumulated number of tooth-skipping that is detected by the section for detecting the tooth-skipping by using the predetermined accumulated number of tooth-skipping that is stored in the memory section.

The predetermined accumulated number of tooth-skipping corresponds to an indication of the upper limit of the accumulated number of tooth-skipping to be able to drive the speed reducer. If the accumulated number of tooth-skipping exceeds the predetermined accumulated number, the speed reducer is basically determined to be damaged. The predetermined accumulated number of tooth-skipping can be set as a number to measure the tooth-skipping of the speed reducer or a number calculated by multiplying the measured number by a predetermined constant. If the predetermined accumulated number is specified in the specification of the product, the number in the specification or a number calculated by multiplying the number in the specification by a predetermined constant can be used as the predetermined accumulated number.

A remainder calculated by subtracting the actual number of tooth-skipping at the present time from the predetermined accumulated number of tooth-skipping indicates an accumulated number of tooth-skipping that occurred occur during the time when the speed reducer could have been used. Thus the lifetime of the speed reducer can be predicted by using the remainder.

Advantageous Effects of the Invention

As discussed above, by the rotary driver of the present invention tooth-skipping of the speed reducer of the rotary driver can be detected by a light and small mechanism.

BEST MODE FOR CARRYING OUT THE INVENTION

Below, an embodiment of the present invention is discussed with reference to the drawings. Below, the embodiment of the rotary driver of the present invention is discussed with reference to FIGS. 1 to 12.

Figure 3:
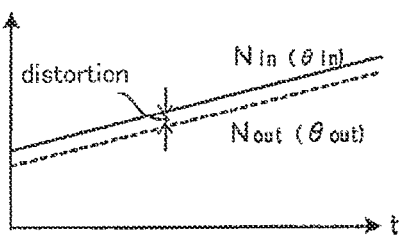
FIG. 3 is a diagram illustrating the operations for detecting tooth-skipping by the present invention.
Figure 3:
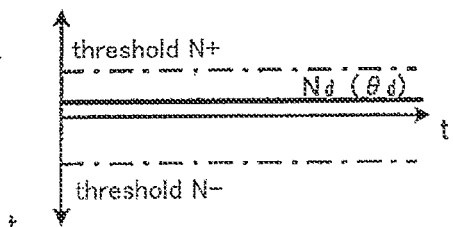
Figure 3:
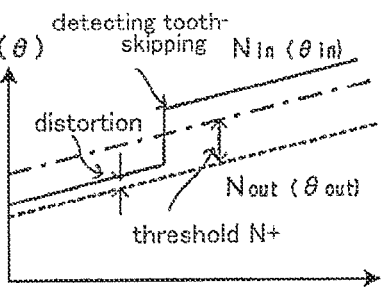
Figure 3:
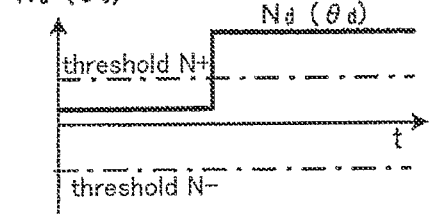
Figure 3:
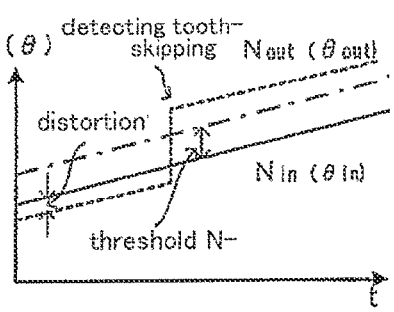
Figure 3:
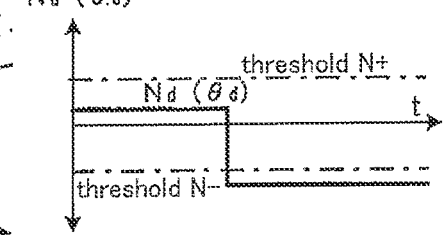
Figure 3:
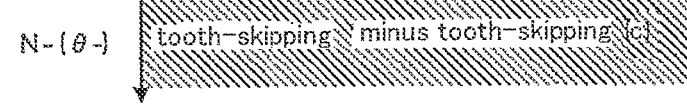
Figure 4:
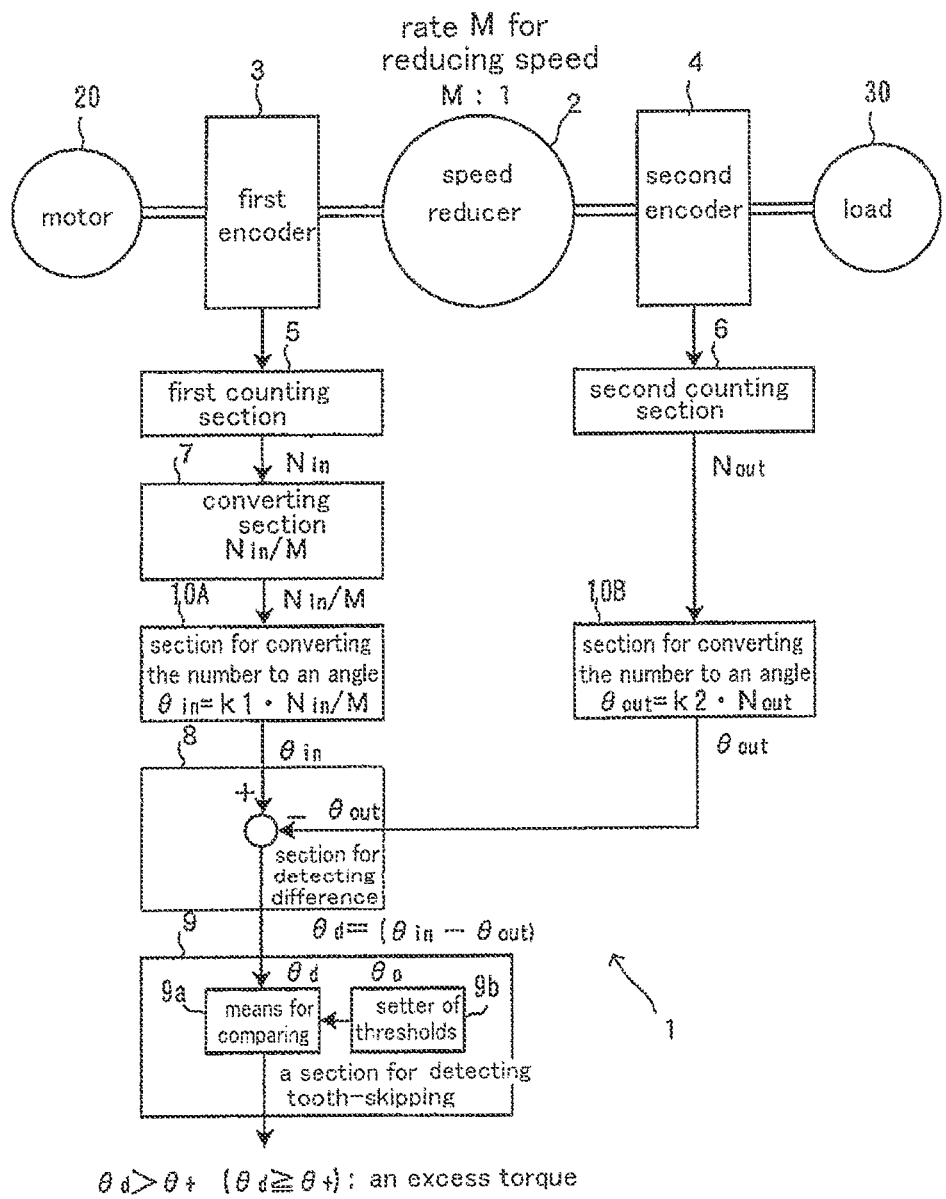
FIG. 4 is a schematic block diagram of the second embodiment of the present invention.
Figure 5:
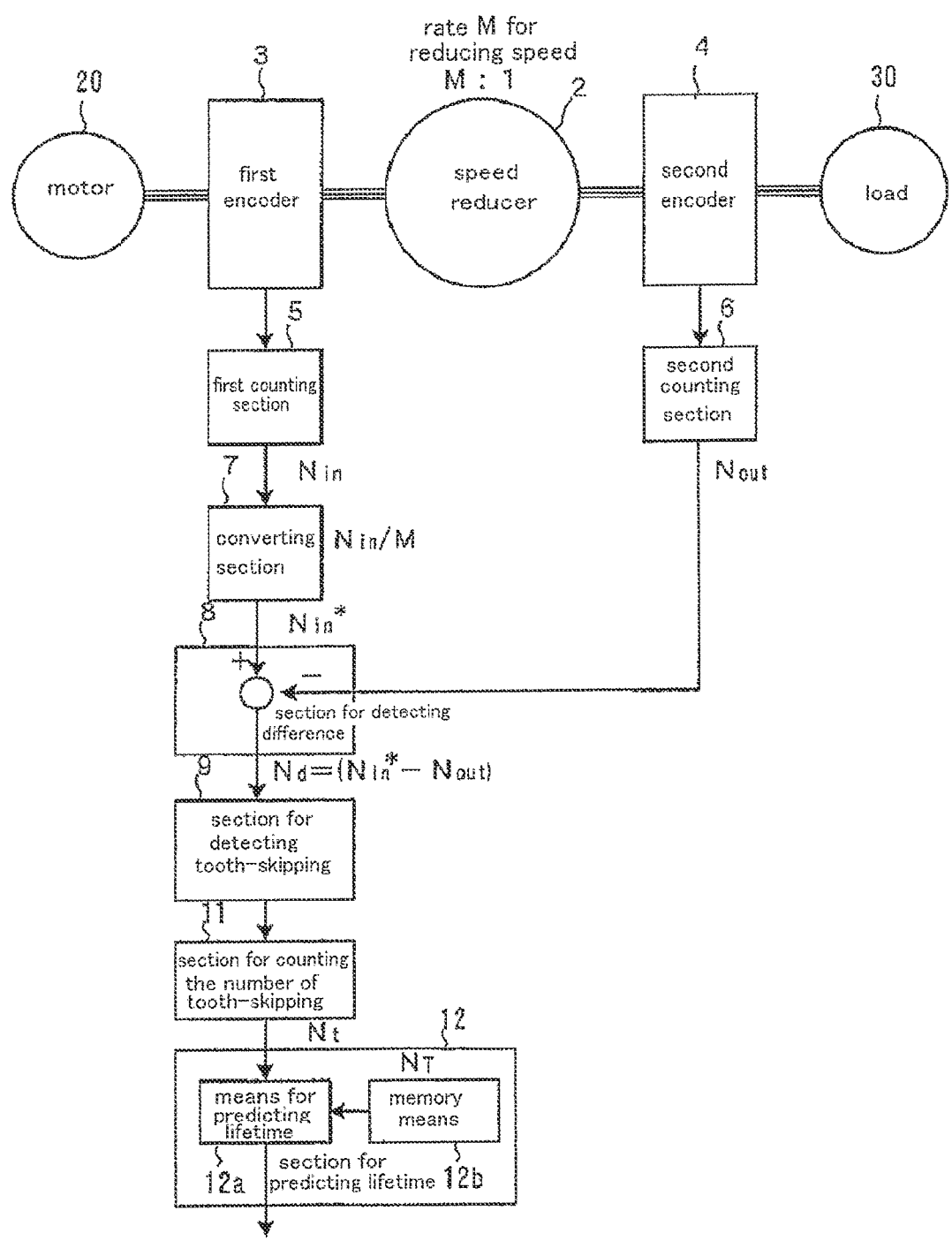
FIG. 5 is a diagram of the configuration for predicting a lifetime by the means of the rotary driver of the present invention.
Figure 6:
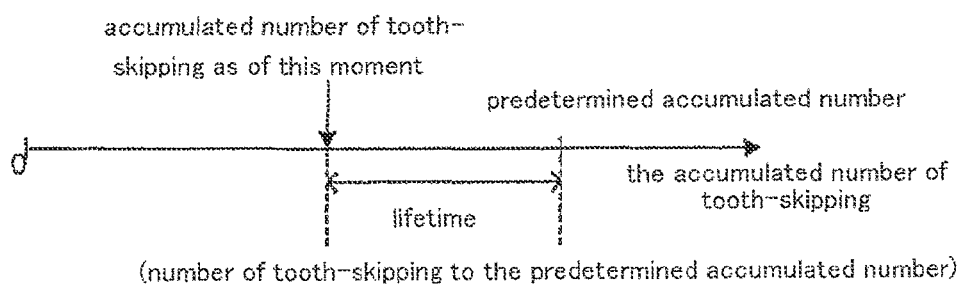
FIG. 6 is a diagram illustrating the operations for predicting a lifetime by the means of the rotary driver of the present invention.
Figure 6:
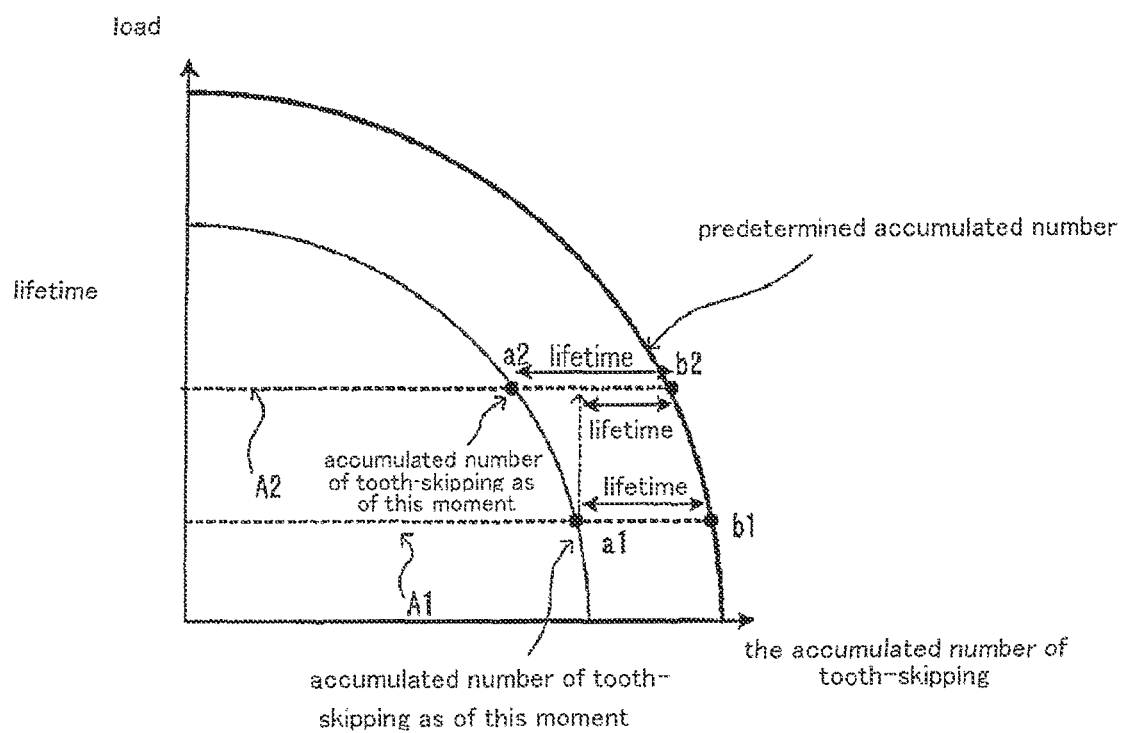

FIGS. 1 to 4 are diagrams illustrating the configuration and the operations of the rotary driver of the present invention. FIGS. 5 and 6 are diagrams illustrating the configuration and the operations for predicting a lifetime by using the rotary driver of the present invention. FIGS. 7 to 12 are diagrams illustrating the configuration and the operations for correcting the difference by using the rotary driver of the present invention.

Detecting Tooth-Skipping

Figure 1:
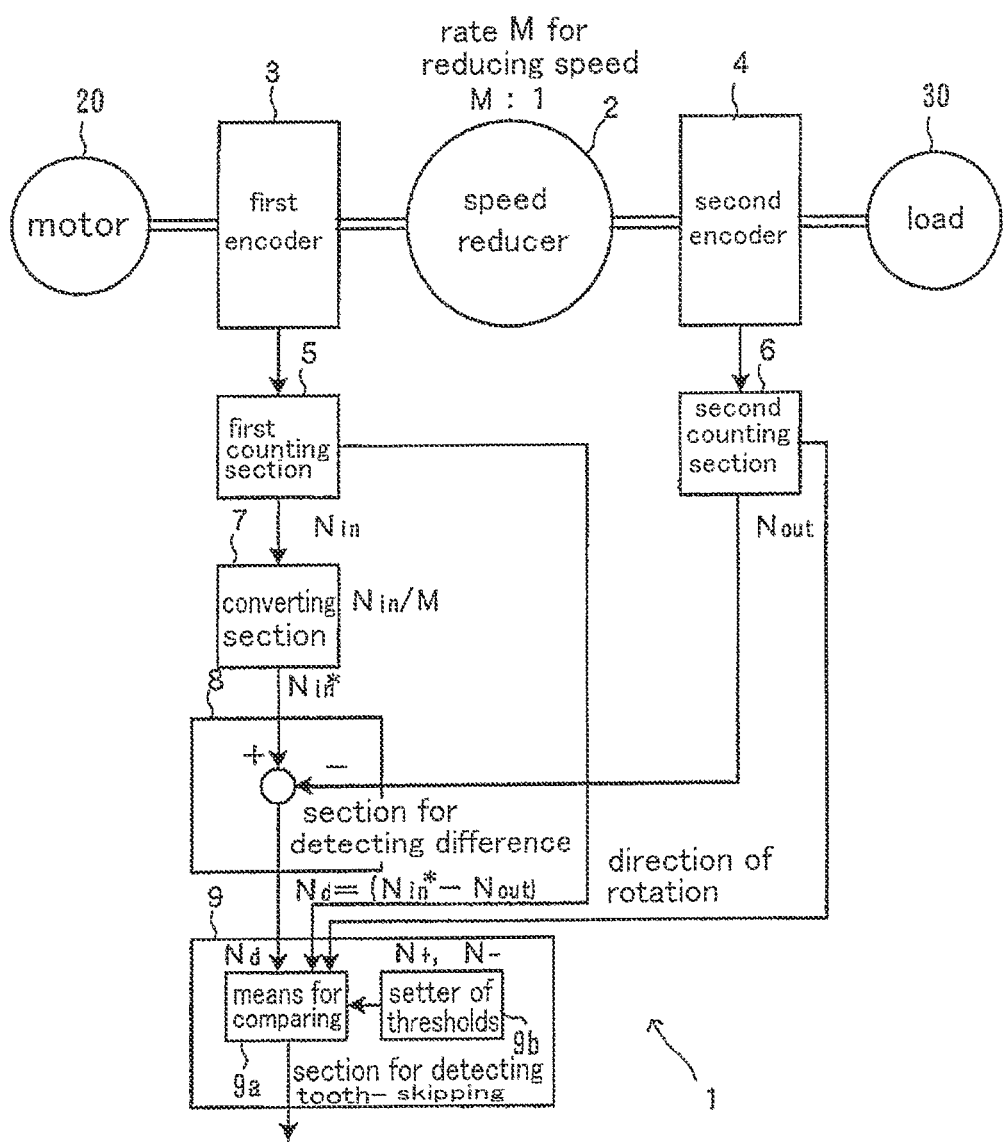
FIG. 1 is a schematic block diagram of the first embodiment of the present invention.
Figure 2:
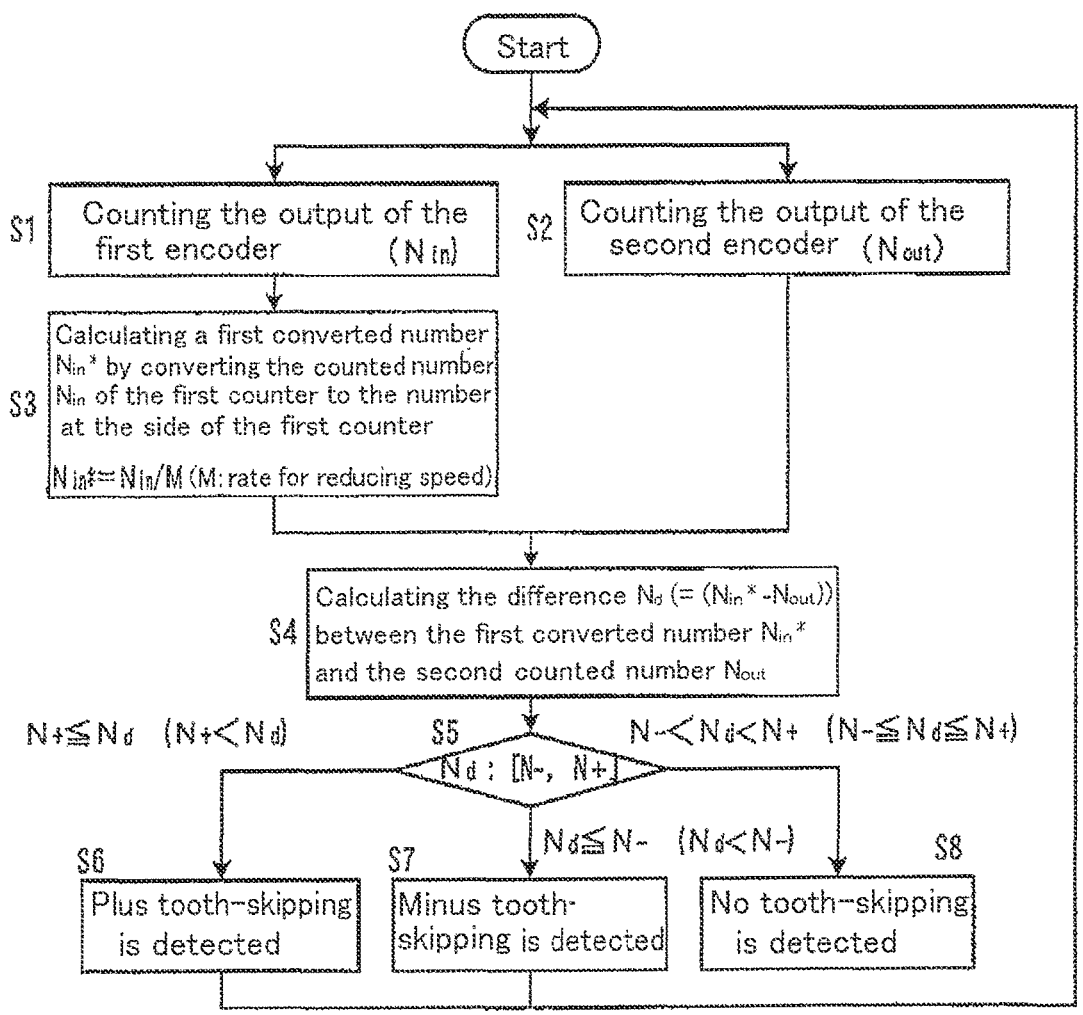
FIG. 2 is a flowchart illustrating the operations for detecting tooth-skipping by the present invention.

First, the embodiment and exemplary operations of the rotary driver of the present invention are discussed. FIG. 1 is a schematic block diagram of the first embodiment of the present invention. FIGS. 2 and 3 are flowcharts illustrating the operations for detecting tooth-skipping by the present invention. FIG. 4 is a schematic block diagram of the second embodiment of the present invention.

FIG. 1 shows the outline of the first embodiment of the rotary driver of the present invention. The rotary driver 1 includes a first encoder 3, a speed reducer 2, and a second encoder 4. It is located between a motor 20 and a load 30. The speed reducer 2 reduces the speed of the rotation of the rotary shaft at the side of the motor 20. It transmits the reduced rotary speed to the rotary shaft at the side of the load 30. The rate M for reducing the speed by the speed reducer 2 denotes that the ratio of the number of rotations of the rotary shaft at the side of the motor to the number of rotations of the rotary shaft at the side of the load is M:1.

The first encoder 3 detects the number of rotations of the rotary shaft at the side of the motor 20. The second encoder 4 detects the number of rotations of the rotary shaft at the side of the load 30. Both the first encoder 3 and the second encoder 4 may be rotary encoders. They may be located inside the speed reducer 2 or outside it. A rotary encoder outputs two-phase signals that have different phases depending on the direction of the rotation. The direction of the rotation can be found from the phase relationship of the two-phase signals. Based on the direction of the rotation the changes in the detected signals are counted so as to find the number of rotations. The rotary encoder, which outputs two-phase signals, is an example of an incremental rotary encoder. A rotary encoder that outputs single-phase signals and a rotary encoder that outputs signals of positions in relation to a reference position may be used. If the rotary encoder outputs single-phase signals, the direction of the rotation cannot be found from the signals. Thus the direction of the rotation is found from the direction of the current to be applied to the motor.

The rotary encoder is not limited to an incremental rotary encoder, but may be an absolute rotary encoder. A counted number is output by the incremental rotary encoder and a detected angle is output by the absolute rotary encoder.

Both the first encoder and the second encoder may be the absolute rotary encoders or the incremental rotary encoders. Alternatively, one of them may be the absolute rotary encoder and the other may be the incremental rotary encoder.

Below, an embodiment is discussed where both the first encoder and the second encoder are the incremental rotary encoders and the counted number is output from them. A first counting section 5 counts the signals detected by the first encoder 3 so as to find the number of rotations of the rotary shaft at the side of the motor 20. A second counting section 6 counts the signals detected by the second encoder 4 so as to find the number of rotations of the rotary shaft at the side of the load 30. In FIG. 1 two-phase signals that are output from the first encoder 3 and the second encoder 4 are omitted.

The counted number $N_{in}$ at the side of the motor 20, which number is counted by the first counting section 5, is greater than the counted number $N_{out}$ of the rotary shaft at the side of the load 30 by a factor of the rate M for reducing the speed of the speed reducer 2.

If the number of rotations of the rotary shaft at the side of the motor 20 is to be compared with the number of rotations of the rotary shaft at the side of the load 30 by using the counted number $N_{in}$ and the counted number $N_{out}$, the counted number $N_{in}$ is greater than the counted number $N_{out}$ by a factor of the rate M for reducing the speed. Thus they cannot be directly compared. To compare them at the same level, a converting section 7 is connected to the output side of the first counting section 5 so that the counted number $N_{in}$ is divided by the rate M for reducing the speed. Below, the counted number of the first counting section 5, which counted number has been divided, is denoted by $N_{in}^*$. Thus the counted number $N_{in}^*$, which represents the number of rotations of the rotary shaft at the side of the motor 20, can be compared at the same level with the counted number $N_{out}$, which represents the number of rotations of the rotary shaft at the side of the load.

A section 8 for detecting the difference calculates the difference $N_d$ between the counted number $N_{in}^*$ and the counted number $N_{out}$. The difference $N_d$ equals the difference between the counted number, which is converted from the number of rotations of the rotary shaft at the side of the load 30 by a converting section 7, and the counted number, which corresponds to the number of rotations of the rotary shaft at the side of the load 30.

The speed reducer 2 uses a mechanism for reducing the speed of the rotation that reduces a rotated angle caused by backlash to be ignored or be made to be within a set tolerance and that includes an elastic element so that a torque applied to the speed reducer 2 is estimated. A strain wave gearing (Harmonic Drive, a registered trademark) has been known as a speed reducer that decreases backlash and includes an elastic element.

The difference $N_d$, which is an output from the section 8 for detecting the difference, corresponds to the amount of deformation (the torsion) of the rotary shaft of the speed reducer 2. By multiplying the difference in the angle that corresponds to the difference $N_d$ by the torsional stiffness K (the spring constant) of the speed reducer the torque applied to the speed reducer can be estimated. In FIG. 1 the configuration for estimating the torque is omitted.

A section 9 for detecting the tooth-skipping detects an occurrence of tooth-skipping of the speed reducer 2 based on the difference $N_d$, which is output from the section 8 for detecting the difference. If no tooth-skipping occurs in the speed reducer 2, the difference $N_d$ corresponds to the amount of deformation (the torsion) of the rotary shaft of the speed reducer 2. However, if tooth-skipping occurs in the speed reducer 2, the difference $N_d$ includes the counted number that corresponds to the gap caused by tooth-skipping in addition to the counted number that corresponds to the amount of deformation (the torsion) of the rotary shaft of the speed reducer 2.

The section 9 for detecting the tooth-skipping compares the difference $N_d$ with predetermined thresholds ($N_+$, $N_-$). If the difference $N_d$ is greater than, or greater than, or equal to, the threshold the section 9 detects the occurrence of tooth-skipping in the speed reducer. If the difference $N_d$ is smaller than, or smaller than, or equal to, the threshold $N_-$, the section 9 also detects the occurrence of tooth-skipping in the speed reducer.

The difference $N_d$ on the occurrence of tooth-skipping is preliminarily measured or simulated. The threshold ($N_+$, $N_-$) can be determined as the number that is obtained by adding an allowance to the measured number or the simulated number.

The threshold $N_+$ is the threshold that is compared with a positive difference $N_d$. The threshold $N_-$ is the threshold that is compared with a minus difference $N_d$. The positive difference $N_d$ is used when the number of rotations of the rotary shaft at the side of the motor 20 is greater than, or greater than, or equal to, the number of rotations of the rotary shaft at the side of the load 30, i.e., when the counted number $N_{in}^*$ is greater than, or greater than, or equal to, the counted number $N_{out}$. If the difference $N_d$ is greater than, or greater than, or equal to, the threshold $N_+$, it is determined that plus tooth-skipping occurs.

The negative difference $N_d$ is used when the number of rotations of the rotary shaft at the side of the load 30 is smaller than, or smaller than, or equal to, the number of rotations of the rotary shaft at the side of the motor 20, i.e., when the counted number $N_{out}$ is greater than, or greater than, or equal to, the counted number $N_{in}^*$. If the difference $N_d$ is smaller than, or smaller than, or equal to, the threshold $N_-$, it is determined that minus tooth-skipping occurs.

For example, the section 9 for detecting the tooth-skipping is configured to have a means 9b for determining the threshold that determines and stores the threshold ($N_+$, $N_-$) and a means 9a for comparing that compares the difference $N_d$ the threshold ($N_+$, $N_-$). The threshold $N_+$ and the threshold $N_-$ do not necessarily have the same absolute value. Each of them may be determined in accordance with a torque on the occurrence of tooth-skipping based on the configuration of the speed reducer. The threshold ($N_+$, $N_-$) can be determined based on the measured number or on a set number that is specified based on the rated number of the speed reducer.

Next, an example of the operations for detecting tooth-skipping by the embodiment of the Ota driver of FIG. 1 is discussed with reference to FIGS. 2 and 3. In the flowchart of FIG. 2 the steps are denoted by the numbers prefixed by an "S." FIG. 3 shows the case where the rotary shaft at the side of the motor and the rotary shaft at the side of the load rotate in the same direction.

The first counting section 5 counts the output of the first encoder 3 to obtain the first counted number $N_{in}$ (S1). The second counting section 6 counts the output of the second encoder 4 to obtain the second counted number $N_{out}$ (S2). The first counted number $N_{in}$ is divided by the rate M for reducing the speed of the speed reducer 2 to calculate the first converted counted number $N_{in}^*$, which is converted to be at the side of the second counting section 6 (S3). The difference $N_d$ ($=N_{in}^*-N_{out}$) is obtained (S4) between the first converted counted number $N_{in}^*$, which is calculated in S3, and the second counted number $N_{out}$, which is obtained in S2.

The difference $N_d$, which is obtained in S4, is compared with the range of the thresholds [$N_-$, $N_+$]. The positive first threshold $N_+$ and the negative second threshold $N_-$ are prepared (S5). The positive first threshold $N_+$ is compared with the difference if the first converted number $N_{in}^*$, i.e., the first detected value, is greater than, or greater than, or equal to, the second counted number $N_{out}$, i.e., the second detected value. The negative second threshold $N_-$ is compared with the difference if the first converted number $N_{in}^*$, i.e., the first detected value, is smaller than, or smaller than, or equal to, the second counted number $N_{out}$, i.e., the second detected value.

In the comparison in S5, if the difference $N_d$ is between the first threshold $N_+$ and the second threshold $N^-$, it is determined that no tooth-skipping occurs. FIG. 3(a) shows the state where no tooth-skipping occurs when the rotary shaft at the side of the motor and the rotary shaft at the side of the load rotate in the same positive direction. If no tooth-skipping occurs, the difference $N_d$ mainly corresponds to a difference in angles, i.e., a distortion, of the rotary shafts of the speed reducer. The difference $N_d$ is within the range between the first threshold $N_+$ and the second threshold $N_-$.

In the comparison in S5, if the difference $N_d$ is greater than, or greater than, or equal to, the first threshold $N^+$, the plus tooth-skipping is detected. FIG. 3(h) shows the state where tooth-skipping occurs when the rotary shaft at the side of the motor and the rotary shaft at the side of the load rotate in the same positive direction.

The difference $N_d$ corresponds to a difference in angles of the speed reducer. If tooth-skipping occurs in the rotary shaft at the side of the motor, the difference $N_d$ becomes greater than, or greater than, or equal to, the first threshold $N_+$ so that plus tooth-skipping is detected (S6).

Incidentally, when the rotary shaft at the side of the motor rotates in the reverse direction, tooth-skipping can be detected in the same way as S6. In FIG. 3(b) the first converted counted number $N_{in}*$ and the second counted number $N_{out}$ just downwardly incline. A further discussion is omitted.

In the comparison in S5, if the second counted number $N_{out}$ is greater than the first converted counted number $N_{in}*$ and the difference $N_d$ is smaller than, or smaller than, or equal to, the second threshold $N_-$, minus tooth-skipping in the speed reducer is detected.

FIG. 3(c) shows the state where tooth-skipping of the rotary shaft at the side of the load occurs when the rotary shaft at the side of the motor and the rotary shaft at the side of the load rotate in the same positive direction. The difference $N_d$ corresponds to the difference in angles of the speed reducer. If the difference $N_d$ is smaller than, or smaller than, or equal to, the second threshold $N_-$ while tooth-skipping of the rotary shaft at the side of the load occurs, minus tooth-skipping is detected (S7).

FIG. 3(d) shows the relationship between the range of the threshold and tooth-skipping. If the difference $N_d$ is within the range between the first threshold $N_+$ and the second threshold $N_-$, it is determined that no tooth-skipping occurs. If the difference $N_d$ is greater than, or greater than, or equal to, the first threshold $N_+$, it is determined that plus tooth-skipping occurs. If the difference $N_d$ is smaller than, or smaller than, or equal to, the second threshold $N_-$, it is determined that minus tooth-skipping occurs.

The configuration of the rotary driver in FIG. 1 shows an embodiment where tooth-skipping is detected by using the first counted number or the first converted counted number as the first detected value and the second counted number as the second detected value. The first counted number is obtained by counting the output from the encoder. The first converted counted number is obtained by converting the first counted number. The second counted number is obtained by counting the output from the encoder. The first detected value and the second detected value may be detected angles by absolute encoders.

Tooth-skipping can be detected based not only on the counted number by incremental encoders, but also on the rotated angles of the rotary shafts or the detected angles by absolute encoders. Below, an embodiment is discussed where the counted numbers by the incremental encoders are used.

The rotated angle can be calculated by the angular transformation where the rotation-counted number of the rotary shaft is multiplied by the coefficient k. The coefficient k is a factor that describes the relationship between the number of rotations of the encoder and the number of rotations of the rotary shaft. Here, the factor that describes the relationship between the counted number that is counted by the first encoder 3 and the rotary shaft at the side of the motor is called a coefficient k1. The factor that describes the relationship between the counted number that is counted by the second encoder 4 and the rotary shaft at the side of the load is called a coefficient k2.

FIG. 4 is a block diagram illustrating an embodiment that detects tooth-skipping by using the rotated angle. The configuration of the embodiment is very similar to that in FIG. 1. Below, the discussion on the configuration that is common to the configuration in FIG. 1 is omitted.

In FIG. 4 the rotary driver 1 comprises a section 10A for converting the number to an angle that converts the first converted counted number $N_{in}*$ ($=N_{in}/M$) to the rotated angle $\theta_{in}$ and a section 10B for converting the number to an angle that converts the second counted number $N_{out}$ to the rotated angle $\theta_{OUT}$. The rotated angle $\theta_{in}$ that is output by the section 10A for converting the number to an angle and the rotated angle $\theta_{OUT}$ that is output by the section 10B for converting the number to an angle are input to the section 8 for detecting the difference. The section 8 for detecting the difference calculates the difference $\theta_d$ ($=\theta_{in}-\theta_{OUT}$) from the rotated angle $\theta_{in}$ and the rotated angle $\theta_{OUT}$.

The difference $\theta_d$, which is output by the section 8 for detecting the difference, equals the angle that corresponds to the amount of deformation (the torsion) of the rotary shaft of the speed reducer 2. The torque that is applied to the speed reducer 2 can be calculated by multiplying the difference $\theta_d$ by the torsional stiffness K (the spring constant) of the speed reducer. In FIG. 4 the configuration for estimating the torque is omitted.

The section 9 for detecting the tooth-skipping detects the occurrence of tooth-skipping in the speed reducer 2 based on the difference $\theta_d$, which is output by the section 8 for detecting the difference. If no tooth-skipping occurs in the speed reducer 2, the difference $\theta_d$ is the value that corresponds to the amount of deformation (the torsion) of the rotary shaft of the speed reducer 2. If tooth-skipping occurs in the speed reducer 2, the difference $\theta_d$ is the value that includes the rotated angle of the rotary shaft that corresponds to the gap caused by tooth-skipping in addition to the rotated angle that corresponds to the amount of deformation (the torsion) of the rotary shaft of the speed reducer 2.

The section 9 for detecting the tooth-skipping compares the difference $\theta_d$ with the preset threshold ($\theta_+$, $\theta_-$). If the difference $\theta_d$ is greater than, or greater than, or equal to, the threshold $\theta_+$, or if the difference $\theta_d$ is smaller than, or smaller than, or equal to, the threshold $\theta_-$, the occurrence of tooth-skipping in the speed reducer is detected.

The difference $\theta_d$ on the occurrence of tooth-skipping is preliminarily measured or simulated. The threshold ($\theta_+$, $\theta_-$) can be determined based on the measured or simulated difference $\theta_d$ or on a set value that is specified as the speed reducer. The difference $\theta_d$ can be determined by adding an allowance to the measured value, simulated value, or set value.

The threshold $\theta_+$ is one that compared with the positive difference $\theta_d$. The threshold $\theta_-$ is one that is compared with the negative difference $\theta_d$. The positive difference $\theta_d$ is used where the number of rotations of the rotary shaft at the side of the motor 20 is greater than the number of rotations of the rotary shaft at the side of the load 30, i.e., the counted number $\theta_{in}*$ is greater than the counted number $\theta_{out}$. If the difference $\theta_d$ is greater than, or greater than, or equal to, the threshold $N_+$, it is determined that plus tooth-skipping occurs.

The negative difference $\theta_d$ is used where the number of rotations of the rotary shaft at the side of the load 30 is greater than the number of rotations of the rotary shaft at the side of the motor 20, i.e., the counted number $\theta_{out}$ is greater than the counted number $\theta_{in}*$. If the difference $\theta_d$ is smaller than, or smaller than, or equal to, the threshold $\theta_-$ it is determined that minus tooth-skipping occurs.

For example, the section 9 for detecting the tooth-skipping is configured to have a means 9b for determining the threshold that determines and stores the threshold ($\theta_{30}$, $\theta_-$) and a means 9a for comparing that compares the difference $\theta_d$ with the threshold ($\theta_+$, $\theta_-$). The threshold $\theta_+$ and the threshold $\theta_-$ do not necessarily have the same absolute value. Each of them may be determined in accordance with a torque on the occurrence of tooth-skipping based on the configuration of the speed reducer.

FIGS. 1, 2, and 3 illustrate the embodiment there two thresholds ($N_+$, $N_-$) are determined. However, if the torque in the rotary shaft at the side of the motor 20 of the speed reducer 2 is normally greater than the torque of the rotary shaft at the side of the load 30, only the threshold $N_+$ may be determined, so that plus tooth-skipping is detected. Likewise, the embodiment may be configured so that only minus tooth-skipping is detected.

FIG. 4 illustrates the embodiment where two thresholds ($\theta_+$, $\theta_-$) that are specified as the rotated angles are determined. If the torque in the rotary shaft at the side of the motor 20 of the speed reducer 2 is normally greater than the torque in the rotary shaft at the side of the load 30, only the threshold $\theta_+$ is determined, so that minus tooth-skipping is detected. Likewise, the embodiment may be configured so that only minus tooth-skipping is detected.

Predicting a Lifetime by Using the Detection of Tooth-Skipping

Next, predicting the lifetime of the rotary driver of the present invention based on the detection of tooth-skipping is discussed with reference to FIGS. 5 and 6.

FIG. 5 illustrates an embodiment for predicting the lifetime by using time outputs from the section for detecting the tooth-skipping in the configuration of the rotary driver as in FIG. 1. The discussion on the configuration that is common to the rotary driver in FIG. 1 is omitted. Only the configuration that relates to predicting a lifetime is discussed.

In FIG. 5 the rotary driver has a section 11 for counting the number of tooth-skipping and a section 12 for predicting the lifetime in addition to the configuration that is illustrated in FIG. 1. The section 11 for counting the number of tooth-skipping obtains an accumulated number $N_t$ of tooth-skipping by counting the output of the section 9 for detecting the tooth-skipping. The section 12 for predicting the lifetime predicts the lifetime of the speed reducer by using the accumulated number $N_t$, which is the number of tooth-skipping obtained by the section 11 for counting the number of tooth-skipping.

For example, the section 12 for predicting the lifetime has a memory means 12b that stores the number that accumulates tooth-skipping and a means 12a for predicting the lifetime. The means 12a for predicting the lifetime predicts the lifetime of the speed reducer by using the accumulated number $N_t$ of tooth-skipping, which is detected by the section 9 for detecting the tooth-skipping, based on the predetermined accumulated number, which is stored in the memory means 12b.

For the relationship between the accumulated number of tooth-skipping and the predetermined accumulated number of the speed reducer, a set number that is preliminarily determined by the encoder or a simulated number for a similar speed reducer can be used.

FIG. 6 is a schematic drawing illustrating the relationship between the accumulated number of tooth-skipping and the lifetime of the speed reducer. Incidentally, FIG. 6 shows a typical relationship, but not an actual one.

The section 12 for predicting the lifetime predicts the lifetime of the speed reducer by comparing the accumulated number $N_t$ of tooth-skipping, which is obtained by counting the occurrence of tooth-skipping, with the predetermined accumulated number of tooth-skipping, which is stored in the memory section 12b. The predetermined accumulated number of tooth-skipping corresponds to the number of tooth-skipping by which the speed reducer can be operated. By measuring the number of tooth-skipping of the speed reducer the predetermined accumulated number is determined as the measured number or the number that is calculated by multiplying the measured number by a predetermined factor. Alternatively, if the predetermined accumulated number is specified in the specification of the speed reducer, it may be determined as the number set in the specification or the number that s obtained by multiplying the set number by a predetermined factor.

In the comparison between the predetermined accumulated number $N_t$ of tooth-skipping and the predetermined accumulated number of tooth-skipping, if the accumulated number $N_t$ of tooth-skipping is greater than, or greater than, or equal to, the predetermined accumulated number, the speed reducer is basically determined to be damaged.

A remainder is obtained by subtracting the accumulated number $N_t$ of tooth-skipping as of this moment from the predetermined accumulated number of tooth-skipping. It is deemed to be an accumulated number of tooth-skipping that occurred during a time when the speed reducer is used. The lifetime of the speed reducer is predicted by using the remainder.

FIG. 6(a) schematically illustrates the relationship among the accumulated number of tooth-skipping, the predetermined accumulated number of tooth-skipping, and the lifetime. In FIG. 6(a) the accumulated number ($b_0-a_0$) of tooth-skipping, which is the difference between the accumulated number $a_0$ of tooth-skipping as of this moment and the predetermined accumulated number $b_0$ of tooth-skipping, indicates the lifetime of the speed reducer as of this moment.

FIG. 6(b) schematically illustrates the relationship among the accumulated number of tooth-skipping, the predetermined accumulated number of tooth-skipping, and the lifetime, when the load to be applied to the speed reducer is added. In FIG. 6(b) the ordinate shows the load and the abscissa shows the accumulated number of tooth-skipping. If the load applied to the speed reducer is constant as with load $L_1$, the locus of the accumulated number of tooth-skipping is shown as a lateral line $A_1$ of the accumulated number. The predetermined accumulated number of tooth-skipping, which corresponds to the upper limit of the accumulated number of tooth-skipping, is shown as $b_1$. If the accumulated number of tooth-skipping as of this moment is $a_1$, the accumulated number ($b_1-a_1$) of tooth-skipping, which is the difference between the accumulated number $a_1$ and the predetermined accumulated number $b_1$, indicates the lifetime of the speed reducer as of this moment when the load is assumed to be constant as with load $L_1$.

If the load applied to the speed reducer is constant as with load $L_2$, the locus of the accumulated number of tooth-skipping is shown as the lateral line $A_2$ of the accumulated number. The predetermined accumulated number of tooth-skipping, which corresponds to the upper limit of the accumulated number of tooth-skipping, is shown as $b_2$. If the accumulated number of tooth-skipping as of this moment is $a_2$, the accumulated number $(b_2-a_2)$ of tooth-skipping, which is the difference between the accumulated number $a_2$ and the predetermined accumulated number $b_2$, indicates the lifetime of the speed reducer as of this moment when the load is assumed to be constant as with load $L_2$.

If the load applied to the speed reducer is changed, the relationship is used for predicting the lifetime by changing the lateral lines. For example, assume that the accumulated number as of this moment is $a_1$. If the load is changed from $L_1$ to $L_2$, the lateral line to be used is changed from $A_1$ to $A_2$. Thus the lifetime of the speed reducer is predicted by the accumulated number $(b_2-a_1)$ of tooth-skipping, which is obtained by the difference between the accumulated number $a_1$ as of this moment and the predetermined accumulated number $b_2$.

Correction by the Detection of Tooth-Skipping

Next, the correction that is performed in the rotary driver of the present invention based on the detection of tooth-skipping is discussed with reference to FIGS. 7 to 11. As the correction, for example, the difference that is output by the section for detecting the difference may be corrected based on the detection of tooth-skipping. Or, the detected value, such as the counted number or the rotated angle, may be corrected based on the detection of tooth-skipping.

Correction of the Difference

The process for correcting the difference, which is output by the section for detecting the difference, based on the detection of tooth-skipping, is discussed with reference to FIGS. 7, 8, and 9.

Figure 7:
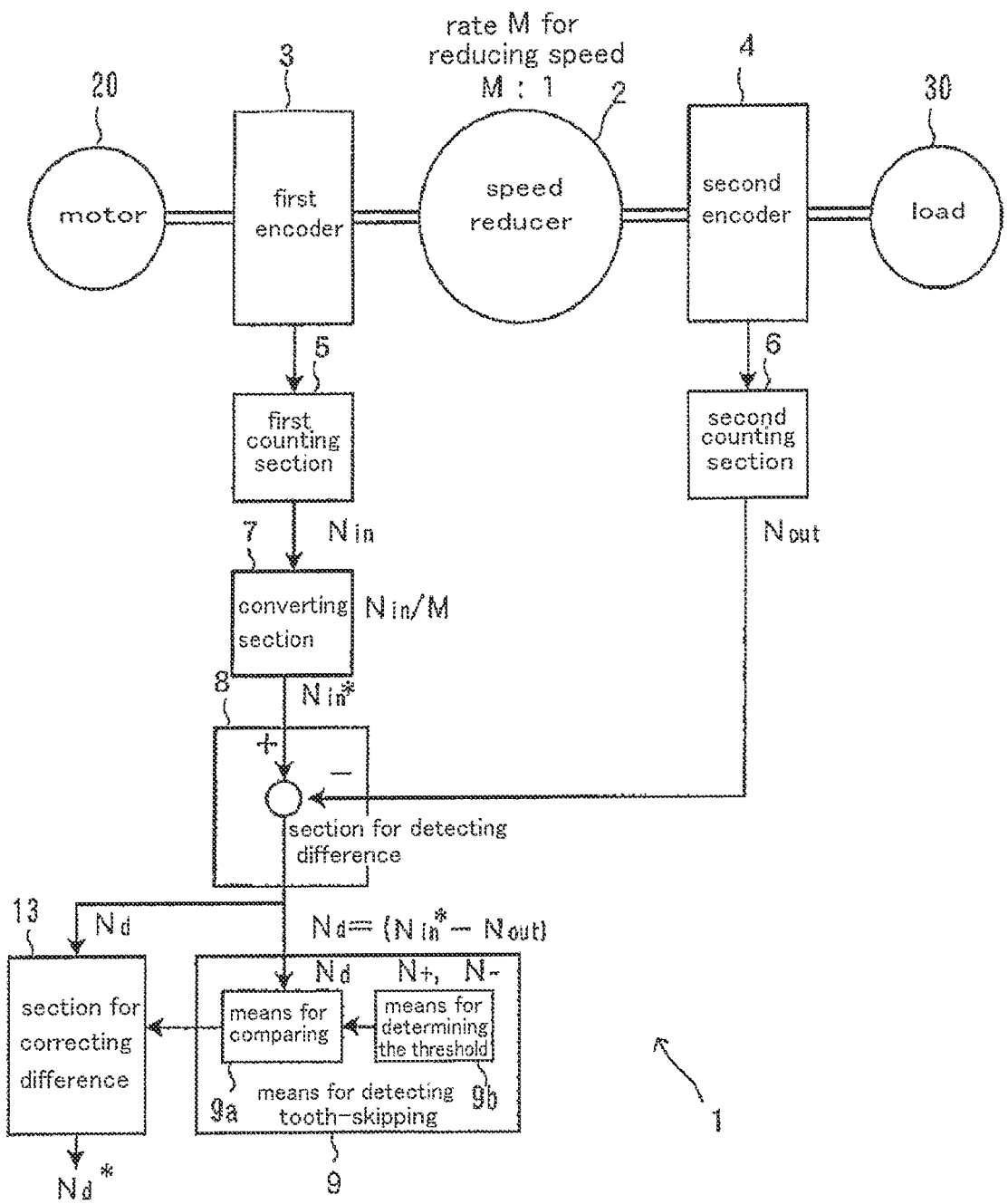
FIG. 7 is a diagram of the embodiment for correcting the difference by the outputs from the section for detecting the tooth-skipping of the present invention.

FIG. 7 illustrates the embodiment for correcting the difference by using the output from the section for detecting the tooth-skipping in the configuration of the rotary driver as in FIG. 1. The discussion on the configuration that is common to the rotary driver as in FIG. 1 is omitted. Only the configuration for correcting the difference is discussed.

In FIG. 7 the rotary driver has the section 13 for correcting the difference in addition to the configuration as in FIG. 1. The section 13 for correcting the difference corrects the difference $N_d$, which is output by the section 8 for detecting the difference, based on the detection of tooth-skipping.

The difference $N_d$ is the difference $(N_{in}*-N_{out})$, which is calculated by subtracting the second counted number $N_{out}$ from the first converted counted number $N_{in}*$. An error may be included in it because of the error in the first converted counted number $N_{in}*$ or the second counted number $N_{out}$ due to tooth-skipping. The section 13 for correcting the difference corrects the difference $N_d$ based on the detection of tooth-skipping, which is output by the section 9 for detecting the tooth-skipping, so as to obtain the corrected difference $N_d*$.

The difference $N_d$ may be a value at the detected moment. Alternatively, it may be an accumulated number for a predetermined duration. If the accumulated number is used, it can be used for the correction and for analyzing the trend of the occurrence of tooth-skipping for the predetermined duration. Incidentally, for example, the predetermined duration may be a duration when any correction is made and the accumulated number is reset when the correction is done.

To calculate the accumulated number, the difference at a moment may be positive or negative. If the difference is simply added to calculate the accumulated number, no problem occurs to use it for correcting the difference. However, to find the trend of the occurrence of tooth-skipping by the accumulated number, the accumulated number may become close to zero so that the accumulated number that indicates the trend is seldom obtained. Thus, for example, the absolute value of the difference is added to calculate the accumulated number so as to obtain the accumulated number that indicates the trend of the occurrence of tooth-skipping.

Figure 8:
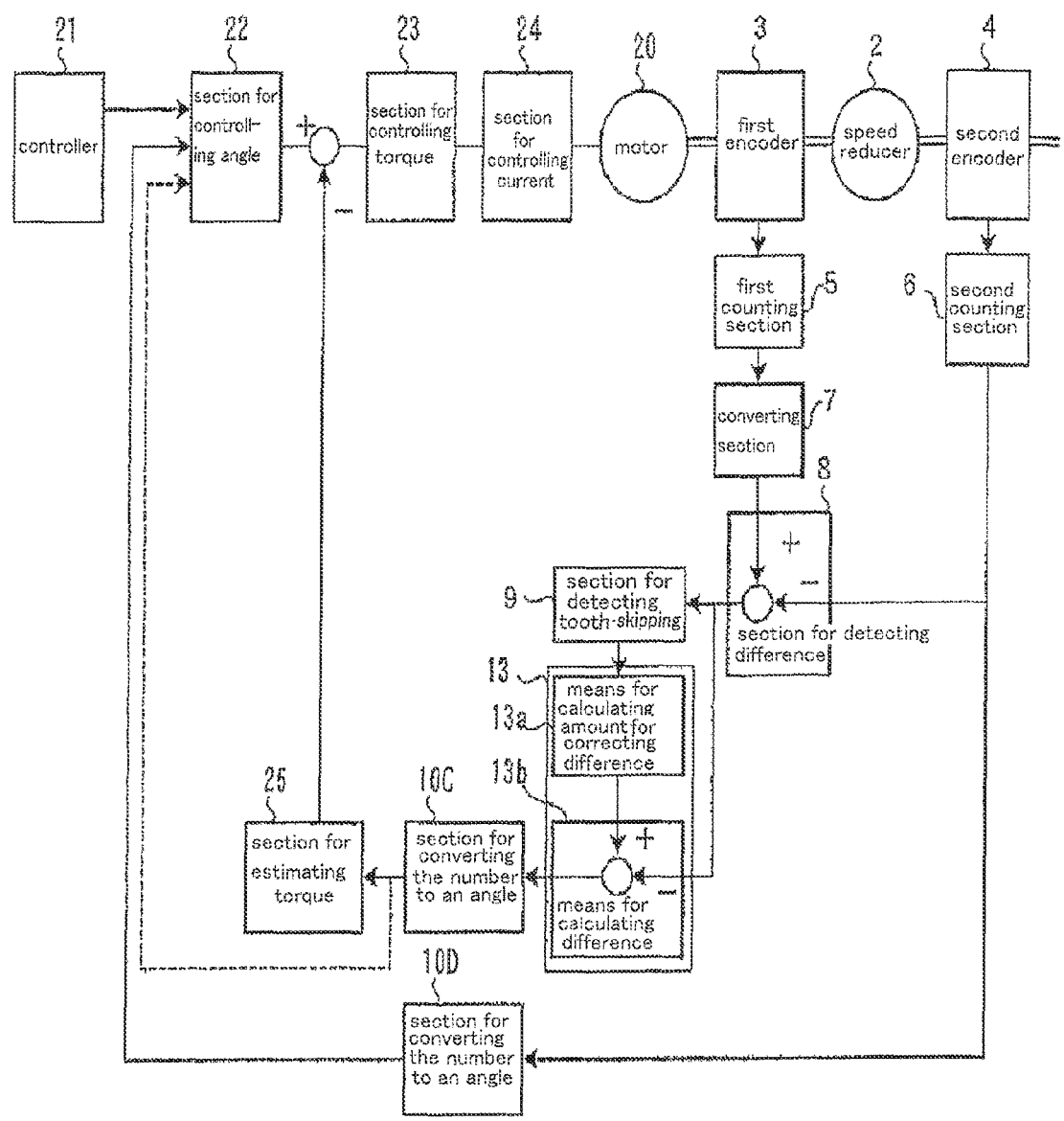
FIG. 8 is a block diagram of the control system that includes the rotary driver of the present invention.

FIG. 8 is a block diagram illustrating the control system that includes the rotary driver. The control system is an example that controls the current supplied to the motor 20 based on the command from a controller 21 to control the rotated angle of the rotary shaft. It comprises the controller 21, a section 22 for controlling the angle, a section 23 for controlling the torque, and a section 24 for controlling the current so as to supply current from the section 24 for controlling the current to the motor 20.

In the control system the controller 21 outputs the designated value to the rotated angle. The designated rotated angle from the controller 21 and the feedback from the rotated angle of the rotary shaft that is connected to the load are input to the section 22 for controlling the angle so that the section 22 outputs the designated torque. The difference between the designated torque from the section 22 and the feedback from the torque to be applied to the speed reducer is input to the section 23 for controlling the torque so that the section 23 outputs the designated current. The section 24 for controlling the current supplies the current to the motor 20 to drive the motor 20. The above configuration of the control system is one example and the control system is not limited to it.

In the control system as in FIG. 8, the designated torque can be obtained by a section 25 for estimating torque. The section 25 for estimating torque converts the difference of the counted number that is detected by the section 8 for detecting the difference to an angle by means of a section 10C for converting the number to an angle so as to obtain the difference of the rotated angle. It obtains the designated torque by multiplying the difference of the rotated angle by the torsional stiffness K of the speed reducer. In addition to the feedback from the rotated angle of the rotary shaft, that is connected to the load, the difference of the rotated angle that is obtained by section 10C for converting the number to an angle may be input to the section 22 for controlling the angle. By inputting the difference of the rotated angle, the accuracy of the rotated angle is enhanced.

The difference of the counted number in the section 8 for detecting the difference is input to the section 13 for correcting the difference so that the corrected difference is calculated by correcting an error caused by tooth-skipping. To calculate the corrected difference, the counted number that corresponds to tooth-skipping is corrected in the counted number that is obtained by the section 8 for detecting the difference. If the difference increases due to tooth-skipping, the counted number is reduced by the increased amount. If the difference decreases due to tooth-skipping, the counted number is added by the decreased amount.

In the control system as in FIG. 8 the rotated angle of the rotary shaft can be calculated by converting the counted number that is counted by the second counting section 6 to an angle by means of a section 10D for converting the number to an angle.

For example, the section 13 for correcting the difference comprises a means 13a for calculating an amount for correcting the difference and a section 13b for correcting the difference that calculates the difference between an amount for correcting the difference that is calculated by the means 13a and the difference.

By the system for controlling the rotation as in FIG. 8, a control system supplying current to the motor based on the designated torque can be configured. FIG. 9 illustrates that control system.

Figure 9:
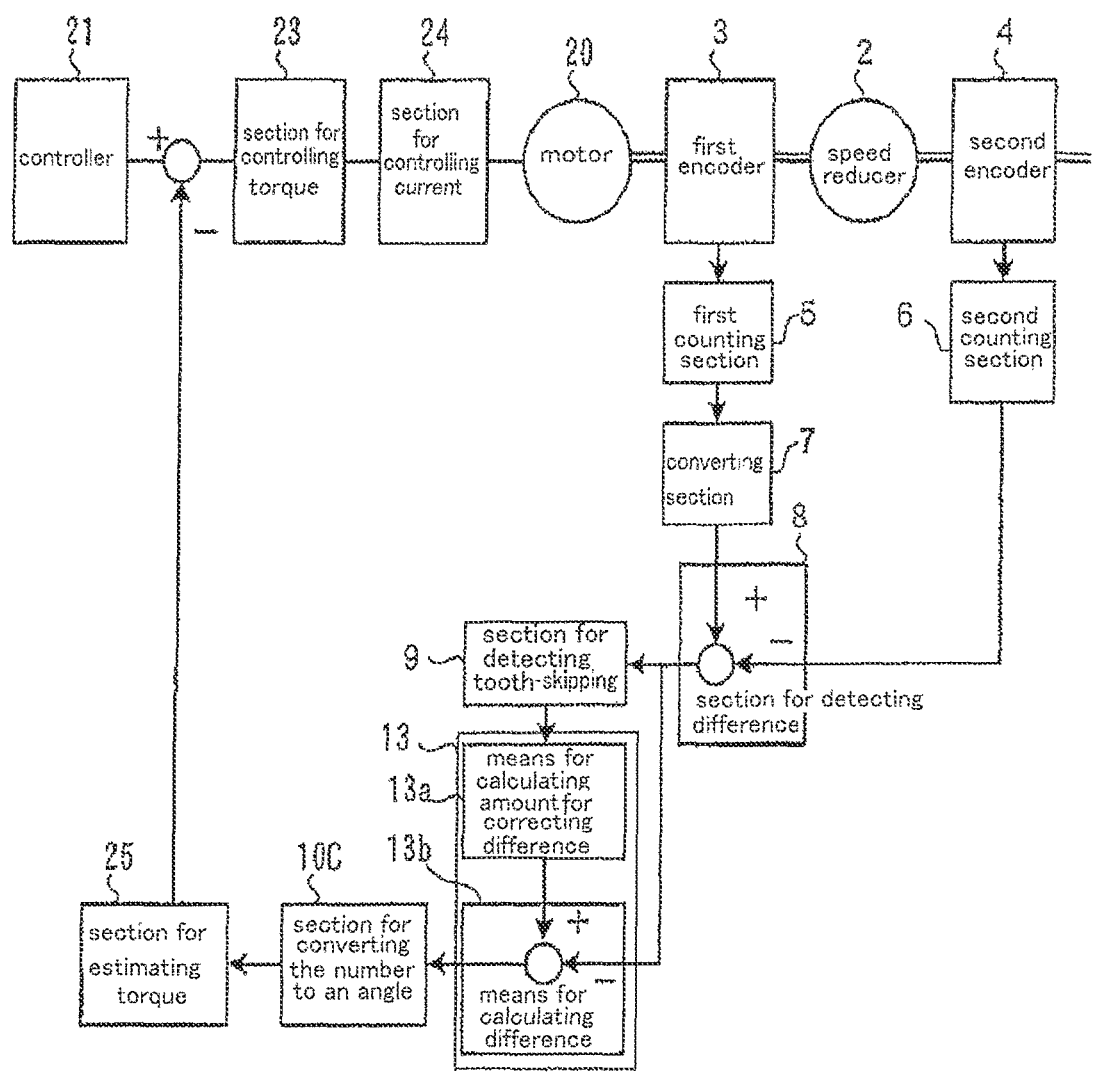
FIG. 9 is a block diagram of the control system that includes the rotary driver of the present invention.

The control system as in FIG. 9 is a system for controlling a target torque. The designated angle and the section 22 for controlling the angle, which section generates the designated torque for bringing the rotated angle close to the designated angle, are omitted in the system for controlling the rotation as in FIG. 8. The estimated torque, which is estimated by the section 25 for estimating torque, and the designated torque, which is the target torque obtained in the controller 21, are input to the section 23 for controlling the torque.

Since the other elements of the control system as in FIG. 9 are the same as those of the control system as in FIG. 8, the discussion on them is omitted.

Figure 10:
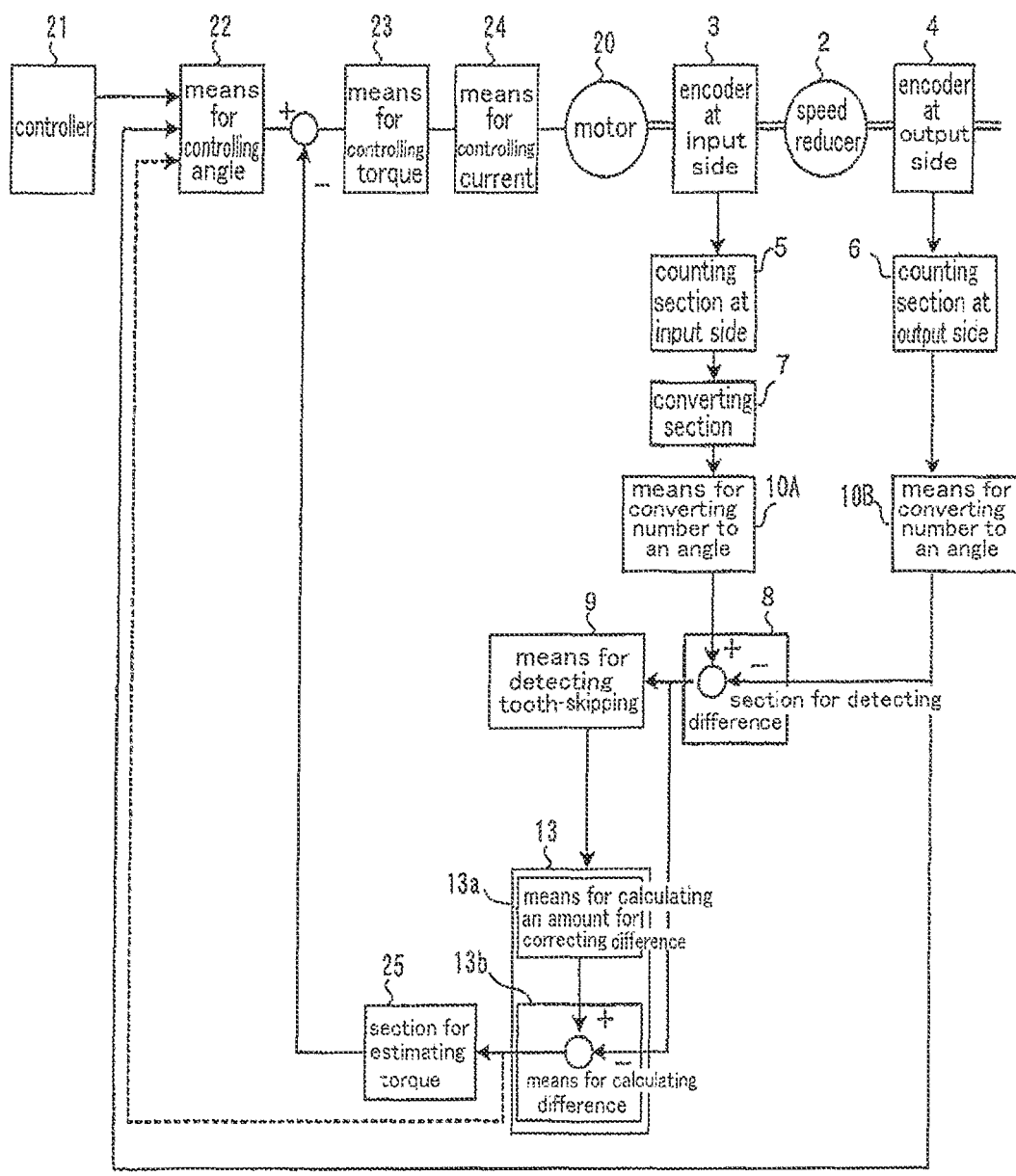
FIG. 10 is a block diagram of the control system that includes the rotary driver of the present invention.

FIG. 10 is a block diagram illustrating the control system that includes the rotary driver. That control system has a first section 10A for converting the number to an angle and a second section 10B for converting the number to an angle, instead of the sections 10C, 10D for converting the number to an angle in FIG. 8. The first section 10A converts the number counted by the first counting section 5 to an angle. The second section 10B converts the number counted by the second counting section 6 to an angle.

In the embodiment as in FIG. 10 the difference in the angles is output by the section 8 for detecting the difference. The control system detects tooth-skipping based on the difference in the angles that is output. It also estimates an estimated torque by inputting the corrected difference to the section 25 for estimating torque. The corrected difference is corrected by the section 13 for correcting the difference to correct an error caused by tooth-skipping.

Like in the circuit as in FIG. 8, the difference in the rotated angles that is obtained by the section 13 for correcting the difference may be input to the section 22 for controlling the angle in addition to the feedback from the rotated angle of the rotary shaft at the side of the load that is converted by the second section 10B for converting the number to an angle. By inputting the difference in the rotated angles the accuracy of the rotated angle is enhanced.

Correction of the Detected Value by the Encoder

Correcting the detected value based on the detection of tooth-skipping is discussed with reference to FIGS. 11 and 12.

Figure 11:
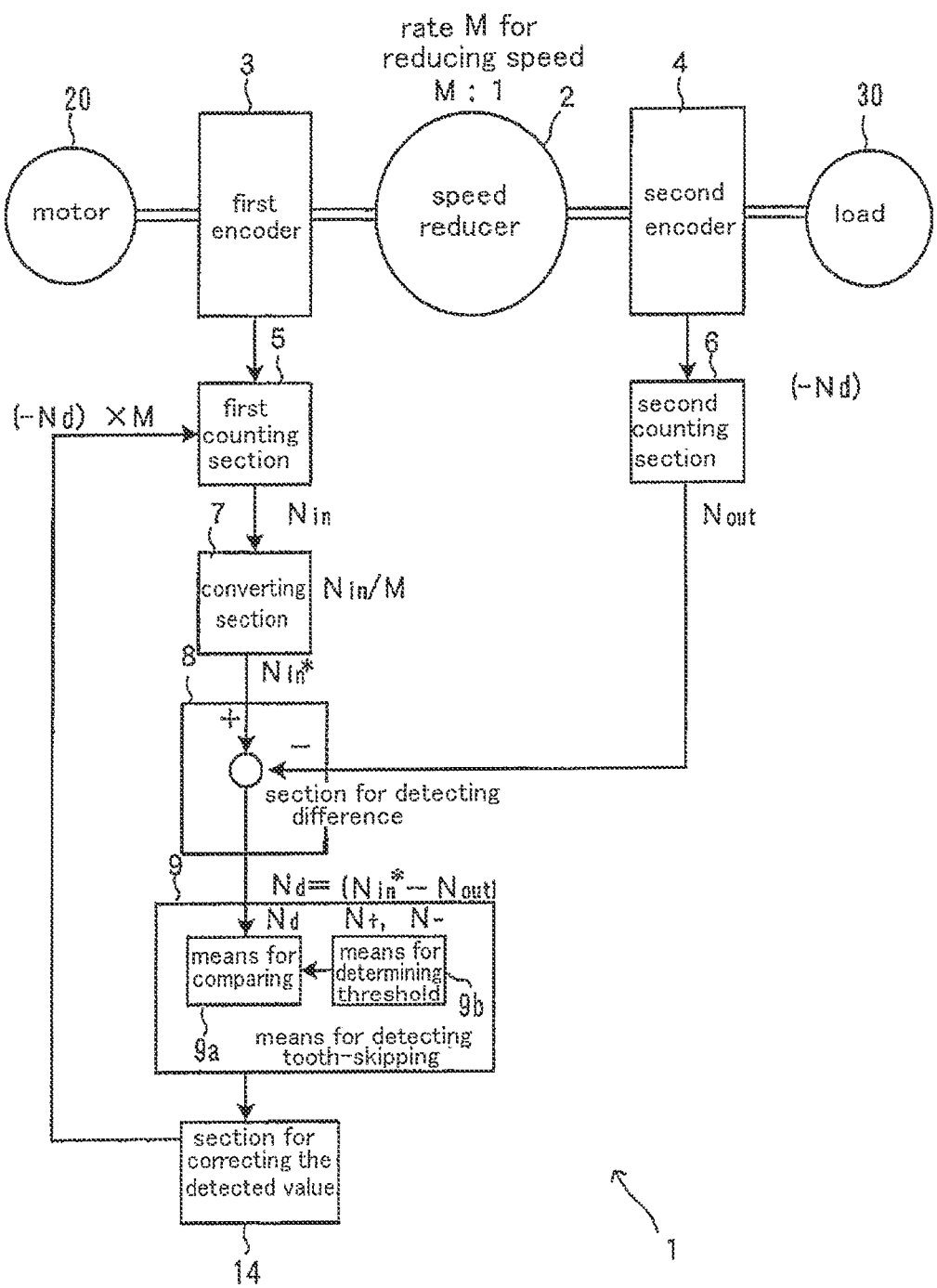
FIG. 11 is a diagram of the embodiment that corrects the counted number by using the output from the section for detecting the tooth-skipping of the present invention.

FIG. 11 illustrates an embodiment for correcting the first counted number, which is the detected value, based on the output by the section for detecting the tooth-skipping in the rotary driver as in FIG. 1. The discussion on the elements that are common to the rotary driver as in FIG. 1 is omitted. Only the configuration for correcting the counted number is discussed. Incidentally, FIG. 11 shows the configuration for correcting the counted number. However, the configuration can be changed to correct the rotated angle, which is converted from the counted number, based on the detection of tooth-skipping.

The rotary driver as in FIG. 11 has a section 14 for correcting the detected value in addition to the elements illustrated in FIG. 11. The section 14 for correcting the detected value corrects the counted number $N_{in}$ of the first counting section 5 based on the detection of tooth-skipping.

If tooth-skipping occurs in the plus direction, the amount obtained by multiplying the difference of the speed reducer, which difference has been preliminarily measured when tooth-skipping occurred, by the rate M for reducing the speed, is deducted from the counted number of the first counting section 5. If tooth-skipping occurs in the minus direction, the difference of the speed reducer, which difference has been preliminarily measured when tooth-skipping occurs, is added to the counted number of the first counting section 5.

Figure 12:
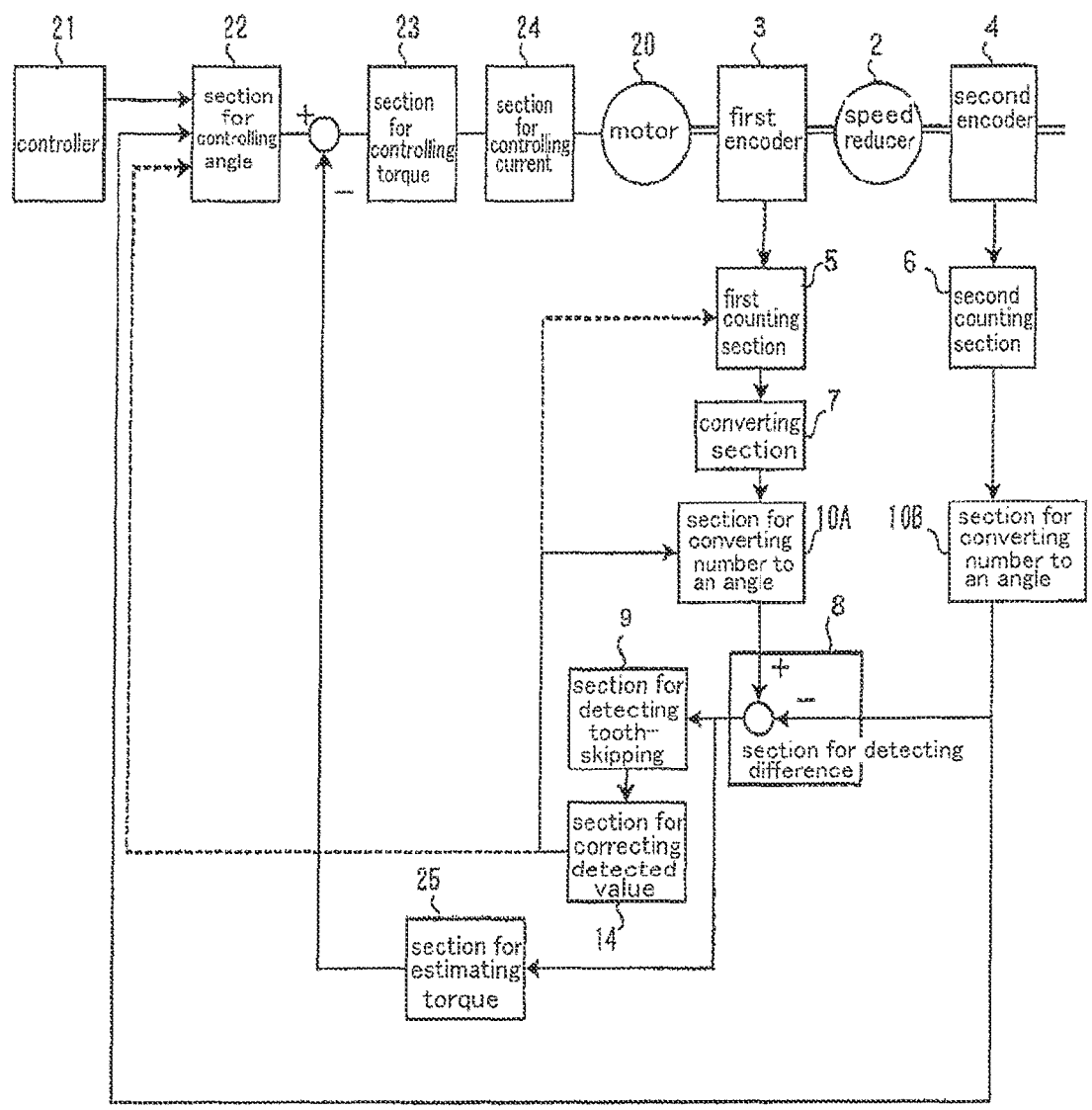
FIG. 12 is a block diagram of the control system that includes the rotary driver of the present invention.

FIG. 12 illustrates the configuration that has the first section 10A for converting the number to an angle and the second section 10B for converting the number to an angle instead of the sections 10C, 10D for converting the number to an angle in FIG. 8. The first section 10A converts the number counted by the first counting section 5 to an angle. The second section 10B converts the number counted by the second counting section 6 to an angle.

In the embodiment, as in FIG. 12, the difference in the angles is output by the section 8 for detecting the difference. The control system detects tooth-skipping based on the difference in the angles that is output. It also corrects the detected value by means of the section 14 for correcting the detected value. The detected value at the side of the motor is corrected by correcting the counted number of the first counting section 5 or the rotated angle of the first section 10A for converting the number to an angle.

If tooth-skipping occurs in the plus direction, the amount obtained by multiplying the difference of the speed reducer, which difference has been preliminarily measured when tooth-skipping occurs, by the rate M for reducing the speed, is deducted from the counted number of the first counting section 5. Alternatively, an amount for correcting the angle that corresponds to that difference is deducted in the first section 10A for converting the number to an angle. If tooth-skipping occurs in the minus direction, the amount obtained by multiplying the difference of the speed reducer, which difference has been preliminarily measured when tooth-skipping occurs, by the rate M for reducing the speed, is added to the counted number of the first counting section 5. Alternatively, an amount for correcting the angle that corresponds to that difference is added in the first section 10A for converting the number to an angle.

In the above discussion, the words "greater than" are used where the value of the comparison (the threshold) is not included. The words "greater than, or equal to" are used where the value of the comparison (the threshold) is included. The words "smaller than" are used where the value of the comparison (the threshold) is not included. The words "smaller than, or equal to" are used where the value of the comparison (the threshold) is included.

If the rotary driver of the present invention is used for a robot, it can be used at a joint that movably connects the elements of the robot, such as arms. Since a robot has many joints, many speed reducers are driven when they are used for the joints. By the speed reducer of the present invention, since tooth-skipping of the speed reducer is detected, the speed reducer can be replaced or repaired before it is broken. Thus the robot is prevented from not being able to be operated for a long time.

The present invention is not limited to the embodiments. Various changes and modifications are possible based on the spirit of the present invention. These changes or modifications are not outside of the scope of the present invention.

INDUSTRIAL APPLICABILITY

The rotary driver of the present invention can be used for driving a joint of a robot, such as that for an arm, a leg, and a hand.

BRIEF DESCRIPTION OF REFERENCE NUMERALS AND SYMBOLS 1 a rotary driver
2 a speed reducer 3 a first encoder
4 a second encoder
5 a first counting section
6 a second counting section
7 a converting section
8 a section for detecting the difference
9 a section for detecting the tooth-skipping
9a a means for comparing
9b a means for determining the threshold
10A, 10B, 10C, 10D a section for converting the number to an angle
11 a section for counting the number of tooth-skipping
12 a section for predicting the lifetime
12a a means for predicting the lifetime
12b a memory means
13 a section for correcting the difference
13a a means for calculating an amount for correcting the difference
14 a section for correcting the detected value
20 a motor
21 a controller
22 a section for controlling the angle
23 a section for controlling the torque
24 a section for controlling the current
25 a section for estimating the torque
30 a load
k a factor
K a torsional stiffness
M a rate for reducing the speed
N a threshold
N_ a threshold
$N_d$ a difference
$N_d^*$ a corrected difference
$N_{in}$ a counted number
$N_{in}^*$ a converted counted number
$N_{out}$ a second counted number
$N_t$ an accumulated number
$N_T$ a threshold
$T_t$ an operating time
$T_T$ a driving time
θ a threshold
$θ_d$ a difference
$θ_{in}$ a rotated angle
$θ_{OUT}$ a rotated angle

The invention claimed is:

1. A rotary driver comprising:
a speed reducer located between a motor and a load, the reducer reducing a rotary speed of a rotary shaft at a side of the motor, the reducer transmitting the reduced rotary speed to a rotary shaft at a side of the load;
a first encoder for detecting a rotation of the rotary shaft at the side of the motor;
a second encoder for detecting a rotation of the rotary shaft at the side of the load;
a section for detecting difference that obtains a difference between a first detected value that is obtained by dividing an output of the first encoder by a rate for reducing the speed by the speed reducer and a second detected value that is obtained from an output of the second encoder; and
a section for detecting tooth-skipping that detects tooth-skipping of the speed reducer based on the difference;
wherein the section for detecting the tooth-skipping compares the difference with a predetermined threshold; and
wherein the section for detecting the tooth-skipping detects tooth-skipping of the speed reducer if the difference is greater than the threshold or if the difference is equal to, or greater than, the threshold.

2. The rotary driver of claim 1, wherein the section for detecting the tooth-skipping determines the difference by subtracting the second detected value from the first detected value;
wherein the threshold includes a positive first threshold that is compared with the difference if the first detected value is greater than the second detected value or if the first detected value is equal to, or greater than, the second detected value and a negative second threshold that is compared with the difference if the first detected value is smaller than the second detected value or if the first detected value is equal to, or smaller than, the second detected value;
wherein plus tooth-skipping wherein a number of rotations at the side of the motor is greater than a number of rotations at the side of the load is detected if the difference is greater than the first threshold or if the difference is equal to, or greater than, the first threshold in a positive side; and
wherein minus tooth-skipping wherein the number of rotations at the side of the motor is smaller than the number of rotations at the side of the load is detected if the difference is smaller than the second threshold or if the difference is equal to, or smaller than, the second threshold in a negative side.

3. The rotary driver of claim 1, further comprising a section for correcting the difference to correct the difference;
wherein the section for correcting the difference obtains an amount for correcting the difference that corresponds to a number of skipped teeth from the difference so as to obtain a corrected difference by correcting the difference by using the amount for correcting the difference.

4. The rotary driver of claim 3, wherein the difference is a value that accumulates absolute values of the difference in a predetermined period.

5. The rotary driver of claim 3, further comprising:
a section for estimating torque that estimates torque by multiplying the corrected difference in a rotated angle by torsional stiffness K of the speed reducer, the corrected difference in a rotated angle being obtained by converting the corrected difference to an angle;
a section for controlling the angle that generates a designated torque so as to bring a rotated angle of the rotary shaft at the side of the load close to a designated angle based on a rotated angle of the rotary shaft at the side of the load, which rotated angle is obtained by converting the second detected value to an angle, or based on the rotated angle and the corrected difference in a rotated angle;
a section for controlling the torque that generates a designated current for bringing the estimated torque close to the designated torque based on difference between the designated torque and the estimated torque; and
a section for controlling current that supplies current to the motor based on the designated current.

6. The rotary driver of claim 3, further comprising:
a section for estimating torque that estimates torque by multiplying the corrected difference in a rotated angle by torsional stiffness K of the speed reducer, the corrected difference in a rotated angle being obtained by converting the corrected difference to an angle;
a section for controlling the torque that generates a designated current for bringing the estimated torque close to the designated torque based on difference between the designated torque and the estimated torque; and a section for controlling current that supplies current to the motor based on the designated current.

7. The rotary driver of claim 1, further comprising a section for correcting the detected value that corrects the detected value;
   wherein the section for correcting the detected value obtains an amount for correcting the detected value from the difference, the amount for correcting the detected value corresponding to a number of tooth-skipping or a value that accumulates the number of tooth-skipping;
   wherein, if the first detected value is a counted number or an angle detected by the first encoder, the counted number or the angle detected by the first encoder is corrected by the amount for correcting the detected value;
   wherein, if the first detected value is a rotated angle that is obtained by converting a number counted by the first encoder to a rotated angle, a rotated angle of the rotary shaft at the side of the motor is corrected by the amount for correcting the detected value; and
   wherein the section for detecting the difference obtains the difference of the counted number or of the detected angle based on the corrected counted number or the corrected detected angle or obtains the difference of the rotated angle based on the corrected rotated angle.

8. The rotary driver of claim 7, further comprising:
   a section for estimating torque that estimates torque by multiplying a difference in a rotated angle or a corrected difference in a rotated angle by torsional stiffness K of the speed reducer, the difference in a rotated angle being obtained by converting the corrected counted number to an angle, the corrected difference in a rotated angle being obtained by converting the corrected difference to an angle;
   a section for controlling an angle that generates a designated torque for bringing a rotated angle of the rotary shaft at the side of the load close to a designated angle based on a rotated angle of the rotary shaft at the side of the load, which rotated angle is obtained by converting the corrected counted number to an angle, or the rotated angle of the rotary shaft at the side of the load and the designated angle;
   a section for controlling the torque that generates a designated current for bringing the estimated torque close to the designated torque based on a difference between the designated torque and the estimated torque; and
   a section for controlling current that supplies current to the motor based on the designated current.

9. The rotary driver of claim 1, further comprising a section for predicting a lifetime that predicts a lifetime of the speed reducer based on a result detected by the section for detecting the tooth-skipping;
   wherein the section for predicting the lifetime comprises:
      a memory section that stores a predetermined accumulated number of tooth-skipping that is determined based on an operational record; and
      a section for prediction that predicts a lifetime of the speed reducer from an accumulated number of tooth-skipping that is detected by the section for detecting the tooth-skipping based on the predetermined accumulated number that is stored in the memory section.

* * * * *